US012479177B2

(12) United States Patent
Bouchereau et al.

(10) Patent No.: US 12,479,177 B2
(45) Date of Patent: Nov. 25, 2025

(54) FACILITY AND METHOD FOR MANUFACTURING AN ANNULAR TIRE ON A LIGHTWEIGHT MONOLITHIC CORE

(71) Applicant: Compagnie Generale Des Etablissements Michelin, Clermont-Ferrand (FR)

(72) Inventors: David Bouchereau, Clermont-Ferrand (FR); Jean Mechin, Clermont-Ferrand (FR); Francois Rouyet, Clermont-Ferrand (FR); Jean-Claude Delorme, Clermont-Ferrand (FR); Stephane Barjon, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 291 days.

(21) Appl. No.: 18/268,500

(22) PCT Filed: Oct. 21, 2021

(86) PCT No.: PCT/FR2021/051851
§ 371 (c)(1),
(2) Date: Jun. 20, 2023

(87) PCT Pub. No.: WO2022/136744
PCT Pub. Date: Jun. 30, 2022

(65) Prior Publication Data
US 2024/0075701 A1   Mar. 7, 2024

(30) Foreign Application Priority Data

Dec. 23, 2020 (FR) ...................... 2014013

(51) Int. Cl.
*B29D 30/02* (2006.01)
*B29D 30/00* (2006.01)
(Continued)

(52) U.S. Cl.
CPC ........... *B29D 30/02* (2013.01); *B29D 30/005* (2013.01); *B29D 30/0661* (2013.01); *B29D 30/12* (2013.01); *B29D 30/20* (2013.01)

(58) Field of Classification Search
CPC ........................... B29D 30/02; B29D 30/0661
See application file for complete search history.

(56) References Cited

U.S. PATENT DOCUMENTS

2011/0209807 A1* 9/2011 Wilson ................... B29C 33/48
264/319
2012/0228791 A1   9/2012 Creasap et al.
2013/0209595 A1   8/2013 Speck et al.

FOREIGN PATENT DOCUMENTS

KR   20120015646 A   2/2012
WO      2011065951 A1   6/2011

* cited by examiner

*Primary Examiner* — John J DeRusso
(74) *Attorney, Agent, or Firm* — Dickinson Wright PLLC

(57) ABSTRACT

The facility comprises a tire-building station that is configured to form an uncured tire on a core. A curing station is configured to cure the assembly formed by the core and the uncured tire so as to obtain a cured annular tire. An extraction station is configured to separate, after the curing operation, the cured tire from the core. The curing station has a first, heating, thermal source which presses against the exchange face of the core for the curing operation and is then dissociated from the core and remains in the curing station in order to leave the exchange face free again when the core and the cured tire are transferred to the extraction station so that a second, refrigerating, thermal source of the extraction (Continued)

station takes the place of the first thermal source in contact with the exchange face of the core so as to cool the core.

15 Claims, 13 Drawing Sheets

(51) Int. Cl.
*B29D 30/06* (2006.01)
*B29D 30/12* (2006.01)
*B29D 30/20* (2006.01)

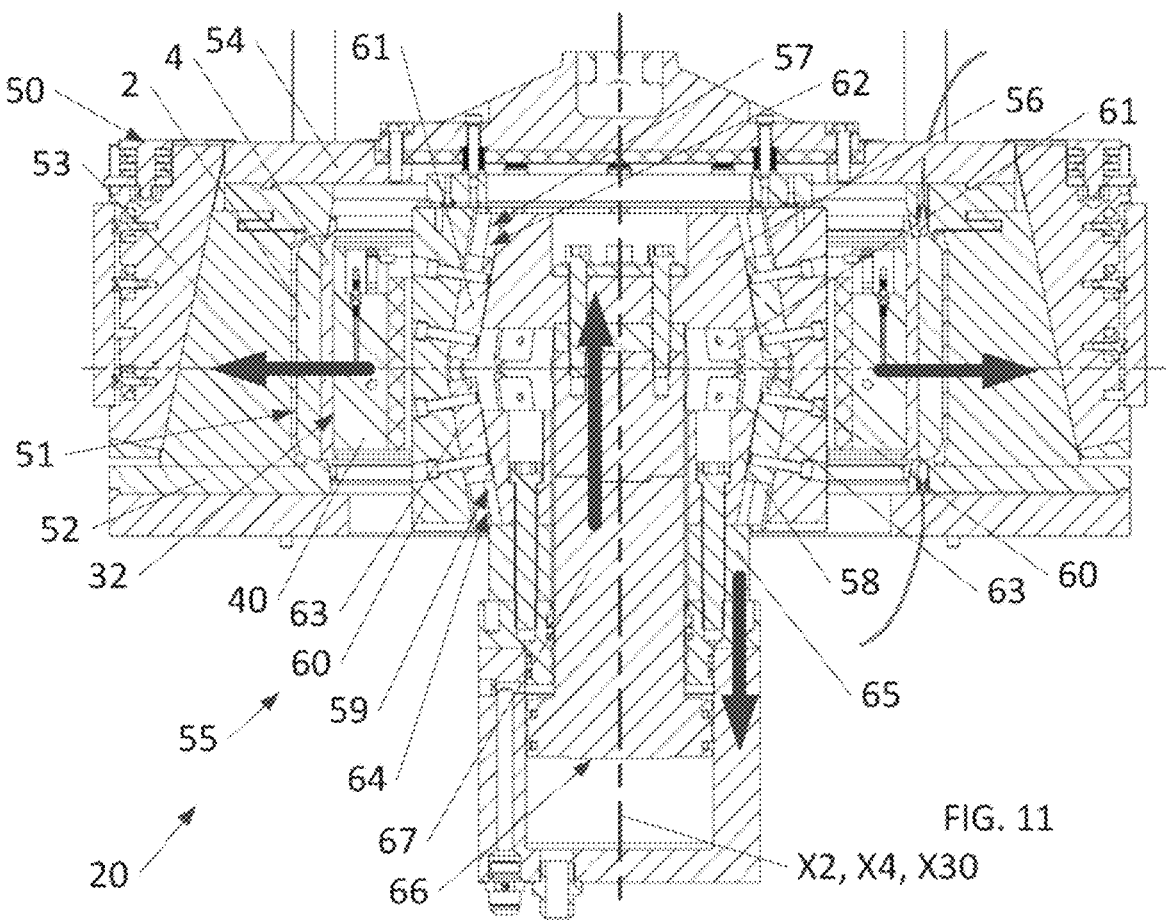
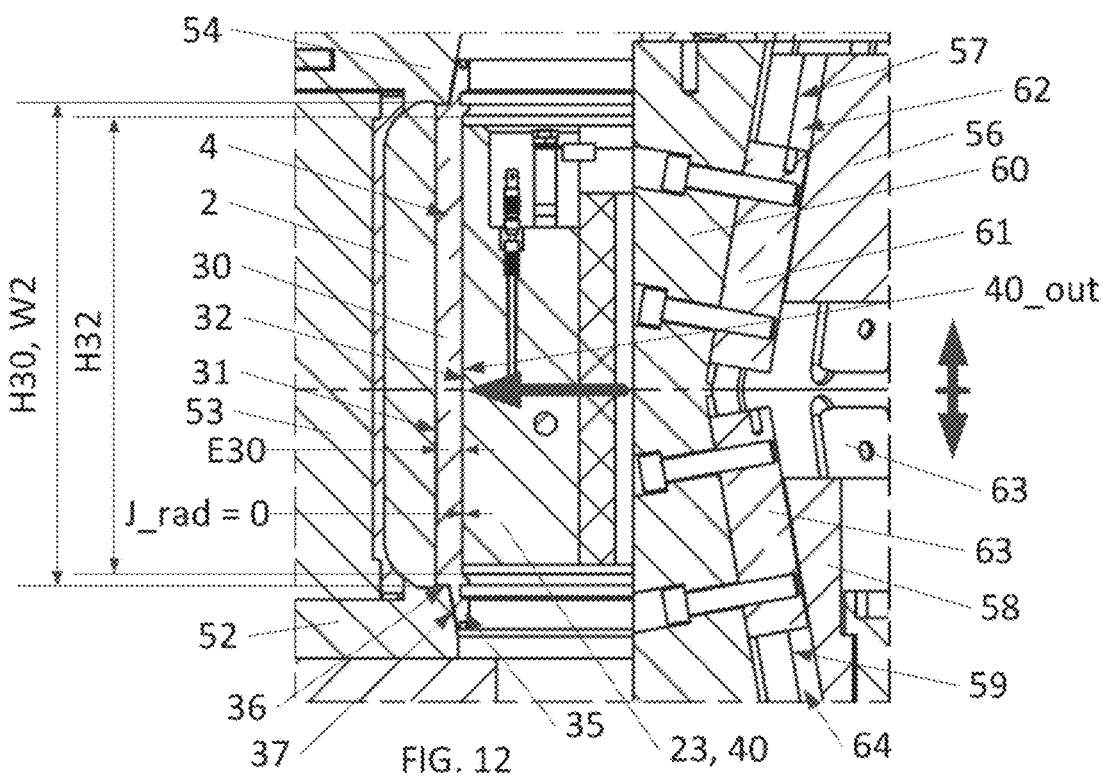

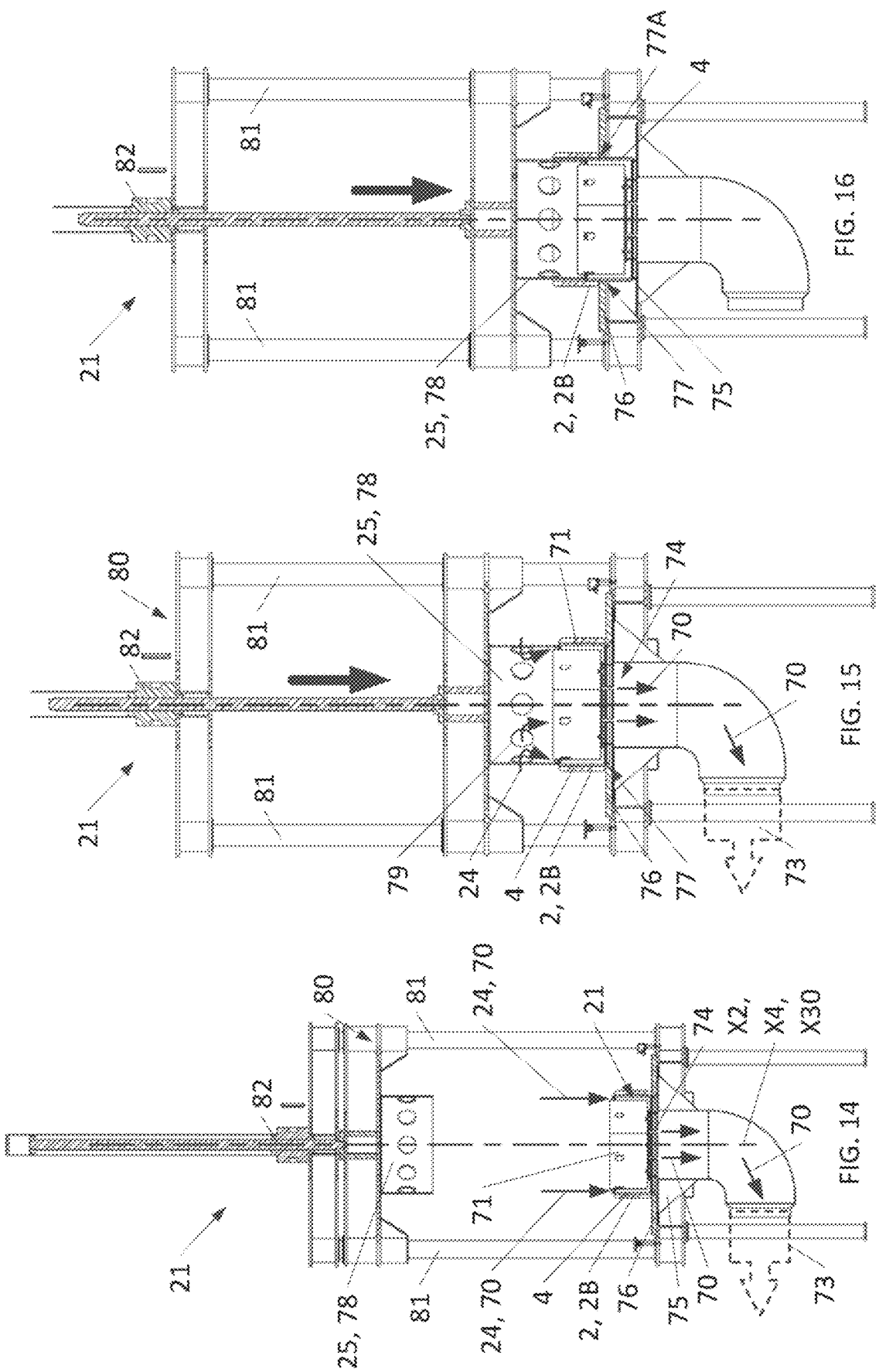

FACILITY AND METHOD FOR MANUFACTURING AN ANNULAR TIRE ON A LIGHTWEIGHT MONOLITHIC CORE

CROSS-REFERENCE TO RELATED APPLICATION

This application claims priority to and the benefit of PCT Patent Application No. PCT/FR2021/051851 filed on 21 Oct. 2021, entitled "FACILITY AND METHOD FOR MANUFACTURING AN ANNULAR TYRE ON A LIGHTWEIGHT MONOLITHIC CORE," and French Patent Application No. FR2014013, filed on 23 Dec. 2020, entitled "FACILITY AND METHOD FOR MANUFACTURING AN ANNULAR TYRE ON A LIGHTWEIGHT MONOLITHIC CORE".

BACKGROUND

1. Field

The present disclosure relates to the field of the manufacture of tires intended to be fitted to the wheels of vehicles, and more particularly the manufacture of so-called "airless", which is to say non-pneumatic, tires in which the tread is supported not pneumatically by a pressurized gas but mechanically by solid members such as spokes which connect the tread to the rim.

2. Related Art

Document WO-2011/065951 in particular discloses how to produce an uncured annular tire by laying, onto a core, one or more tire components at least some of which are based on raw, which is to say unvulcanized, rubber, and then by placing the assembly formed by the core and the uncured annular tire into a curing mold in order to obtain a cured annular tire in which the rubber is vulcanized before finally separating the cured annular tire from the core. In order to separate the cured annular tire from the core, that document for example proposes cooling the core in order to cause the latter to shrink radially relative to the cured annular tire, and then using an ejector to extract the cured annular tire from the core axially.

While such methods offer undeniable multifunctionality in terms of the choice and arrangement of the components of the tire, and make it possible to obtain high-performance and good-quality tires, they do, however, still have certain disadvantages.

In particular, such methods require the use of a relatively heavy, bulky and complex core which notably needs to incorporate heating sources, such as resistive electrical heating cartridges, which are intended to bring the core to the required temperature during the curing operation.

Of course, owing to their complexity, such cores are relatively expensive. They furthermore need sustained maintenance, notably to avoid possible breakdowns of the heating cartridges which may then result in uneven heating of the core, causing defects in the tire to appear during the curing operation.

What is more, because of their mass, the known cores have a relatively high inertia, both from a mechanical standpoint and from a thermal standpoint. Now, of course, the higher the mass of the core, the more energy is required in order to transport the core from one station to another and the more the speed of travel needs to be limited, in order to avoid any accident or any overshoot. Likewise, the higher the mass of the core, the more time and the higher the quantity of energy are required in order to implement the alternating cycles of heating then cooling. In all cases, a high mass of core is therefore detrimental to the cycle time and the costs of operation of the facility.

SUMMARY

The objectives assigned to the disclosure are therefore aimed at overcoming the above-mentioned disadvantages and proposing an improved facility for the manufacture of tires, as well as a corresponding method, which notably offer improved performance in terms, on the one hand, of reducing the duration of the manufacturing cycle and, on the other hand, of reducing the energy consumption.

The objectives assigned to the disclosure are achieved by means of a facility for manufacturing tires. The facility includes a tire-building station configured to place one or more tire components onto a core so as to form an uncured annular tire. A curing station is configured to receive the assembly formed by the core and the uncured annular tire and to heat the assembly during the curing operation so as to obtain a cured annular tire. An extraction station is configured to separate, after the curing operation, the cured annular tire from the core. The core has a tubular wall that extends along and around a central axis and which extends in thickness radially with respect to the central axis from a radially outer first annular face, referred to as "receiving face", which is intended to receive the tire component or components, as far as a radially inner second annular face referred to as "exchange face" which surrounds the central axis and which is intended to allow exchanges of heat between the tubular wall of the core and thermal sources external to the core. The curing station comprises a first, heating, thermal source which is designed to press against the exchange face of the core when the core is in the curing station so as to heat the core and the annular tire during the curing operation, and then dissociate from the core so as to leave the exchange face free again when the core and the cured annular tire leave the curing station and are transferred to the extraction station after the curing operation. The extraction station comprises a second, refrigerating, thermal source which is designed so that when the core and the cured annular tire are in the extraction station, it takes the place of the first thermal source in contact with the exchange face of the core so as to cool the core in such a way as to create a radial clearance between the receiving face of the core and the cured annular tire through differential radial contraction of the tubular wall of the core relative to the cured annular tire thus allowing an ejector member with which the extraction station is equipped to remove the cured annular tire axially from the core.

By virtue of the disclosure, it is possible to keep the first and second thermal sources at their respective station, and in particular to keep the heating thermal source inside the chamber of the curing station without the need to have one or the other of the thermal sources, and particularly the heating thermal source, embedded within the core, and this affords a number of advantages.

Specifically, the disclosure first of all makes it possible to propose a core that can be moved from one station to the other, that has no integrated heating source, and which is therefore a core that is of particularly lightweight structure, of simple shape and compact, and notably a core the tubular wall of which can be particularly thin. A core such as this therefore advantageously exhibits low mechanical inertia, which means that it can be moved around quickly and accurately from one station to the other using a compact transfer device and for a relatively modest expenditure of energy. A core such as this also has low thermal inertia, which means that it can be heated and cooled quickly, via its exchange face, with a relatively small input of energy. The duration of the manufacturing cycle is thus significantly reduced, as is the energy consumption per manufacturing cycle.

Advantageously, the core is all the more compact if the first, heating, thermal source and the second, refrigerating, thermal source finally share the one same exchange face belonging to the core, an exchange surface with which the first and second thermal sources alternately come into contact according to the operation being performed on the core, namely the curing operation and, respectively, the extraction operation. The use of a shared, preferably single, exchange face makes it possible that the second thermal source can be substituted for the first thermal source, and vice versa, at the one same core location, as close as possible to the receiving face supporting the tire, thus making it possible to maximize the working surface area of the exchange face for a given overall core volume. In that way, the effectiveness of the exchanges of heat, notably the effectiveness of exchanges via conduction through the radial thickness of the tubular wall is optimized, while at the same time keeping the overall bulk of the core low.

Next, because the core disassociates from the first, heating, thermal source prior to the extraction operation, the first, heating, thermal source may advantageously remain hot in the chamber of the curing station while the core is, separately, transferred to the extraction station and then subjected to a forced cooling at the extraction station. In that way, the first, heating, thermal source does not experience the cooling imposed on the core, but rather substantially retains its heat between two successive curing operations which are applied to the successive manufacture of a first annular tire and then a second annular tire. Advantageously, the disclosure therefore makes it possible to minimize the working mass of the core that will effectively be subjected to the full range of temperature variations intended through the heating then cooling phases during a manufacturing cycle, because the mass that is specific to the first, heating, thermal source, which can itself always remain hot, is excluded from the working mass. Thus, the facility is able to achieve substantial energy savings and significantly reduce the duration required, at the curing station, to bring the core and the tire up to the required curing temperature.

What is more, by avoiding permanently incorporating the heating thermal source and, more particularly, the heating cartridges, into the radial thickness of the tubular wall of the core, the disclosure makes it possible to keep the tubular wall very thin, so that it therefore exhibits low thermal resistance to exchanges of heat by conduction.

This same absence of a heating thermal source incorporated into the tubular wall furthermore makes it possible that the second, refrigerating, thermal source can be applied as close as possible to the receiving face supporting the tire, without the first, heating, thermal source remaining radially interposed between the second, refrigerating, thermal source and the receiving face supporting the tire.

More generally, none of the first and second thermal sources therefore acts as a barrier, either in terms of passive thermal resistance associated with its thickness, nor in terms of opposing hot/cold associated with the difference between the temperature of the thermal source and the temperature of the other thermal source, to the exchange of heat between the other thermal source and the receiving face, when it is the turn of the other thermal source to act. This absence of interference between the first and second thermal sources, which each operate turn by turn, exclusively of one another on the same core, once again makes it possible to reduce the energy consumption and accelerate the heat transfers, thereby reducing the duration of a manufacturing cycle.

BRIEF DESCRIPTION OF THE DRAWINGS

Further subject matter, features and advantages of the disclosure will become apparent in greater detail upon reading the following description, and with the aid of the appended drawings, which are provided purely by way of non-limiting illustration, in which:

FIG. 11 illustrates, viewed in axial section on the same plane of section as that of FIG. 8, the deployment mechanism and the heating segments in the deployed configuration such that the heating segments are in contact with the exchange face of the core, compressed radially against the exchange face.

FIG. 12 is view of a detail of FIG. 11.

FIG. 14 illustrates, viewed in axial section, an example of an extraction station used in the facility of FIGS. 1 and 2. The station comprises a horizontal receiving table which supports the cured annular tire, a suction device and a lifting plate provided with a central barrel which projects through an opening in the receiving table so that the core supporting the cured annular tire is slipped over the central barrel so as to allow an air flow generated by the suction device and which forms the second, refrigerating, thermal source, to circulate in contact with the exchange face of the core, in an annular flow path which is delimited radially by the exchange face of the core and by the central barrel.

FIG. 15 illustrates, viewed in axial section, the operation of cooling the core and of bringing into contact, with the lateral edge face of the core, an ejector that forms an annular hood provided with vents allowing the air to enter the annular flow path.

FIG. 16 illustrates, viewed in axial section, the separation operation during which the hood that forms the ejector continues its movement, in this case the downward vertical movement, to axially push back the core, which has contracted on account of the cooling, so as to extract the core from the cured annular tire and recover, on the lifting plate that accompanies the axial movement of the hood, the core thus freed.

DESCRIPTION OF EMBODIMENTS

The present disclosure relates to a facility 1 for the manufacture of tires 2.

More preferentially, the facility 1 allows the manufacture of tires 2 intended to be fitted to vehicle wheels.

The tires 2 from the facility 1 will therefore preferably comprise a tread intended to come into contact with the roadway when the vehicle is in service.

The tires 2 according to the disclosure may form part of pneumatic tires, where the tires 2 are mounted on a rim to form an airtight casing inflated with an inflation gas to a pressure higher than atmospheric pressure.

However, in a preferred variant, the tires 2 according to the disclosure form part of non-pneumatic tires known as airless tires, where the tire 2 is supported by a collection of solid spokes of suitable flexibility that connect the tire to the rim.

The tire 2 in all cases is advantageously closed onto itself as an annulus around a central axis X2, and more preferentially forms a cylinder of circular base centered on the central axis X2.

Figure 1:
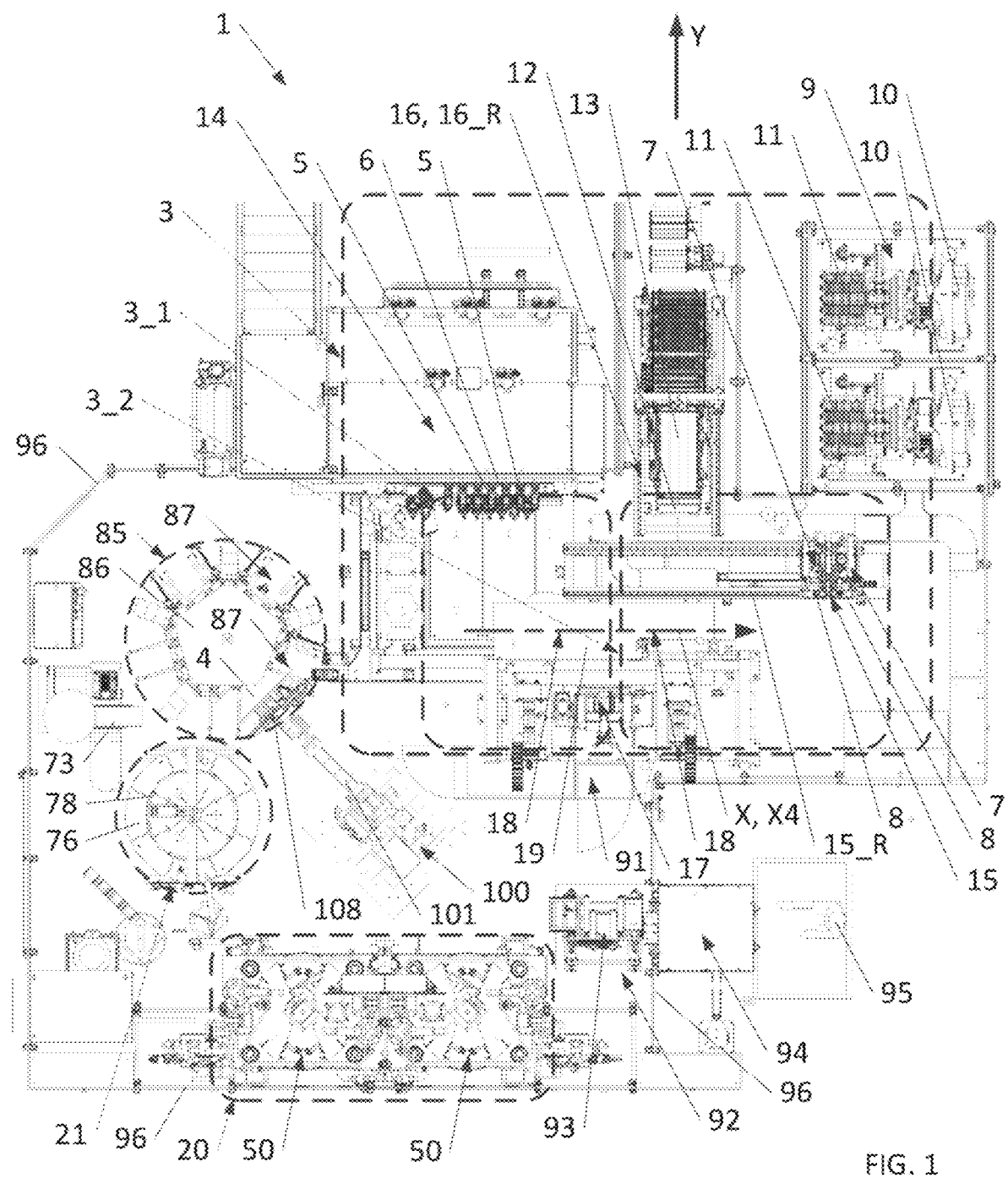
FIG. 1 illustrates, viewed from above, the layout of a facility according to the disclosure.
Figure 2:
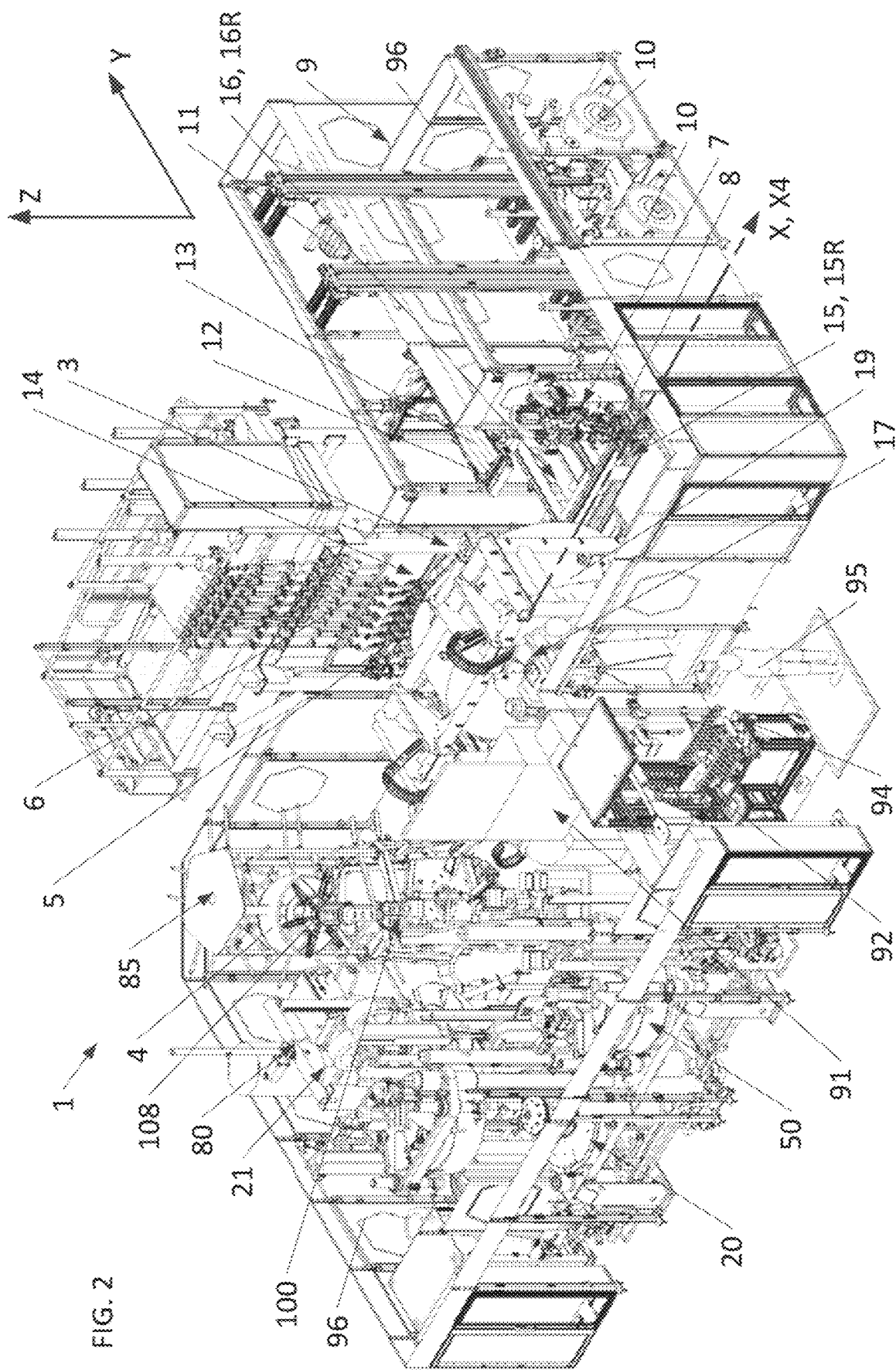
FIG. 2 illustrates, viewed in perspective, the facility of FIG. 1.

As is notably visible in FIGS. 1 and 2, the facility 1 comprises a tire-building station 3 which is configured to place one or more tire components on a core 4 in order to form an uncured annular tire 2A.

The core 4 has a central axis X4 which, in practice, coincides with the central axis X2 of the tire 2 when the tire is on the core 4.

The placement of the tire component or components on the core 4 is preferably done by wrapping, while the core 4 is made to rotate about its central axis X4, and more preferentially by wrapping a continuous tire component which extends as a single piece over the entire required distance of wrapping around the core, which distance may, depending on the nature of the tire component, correspond to a single full revolution of the core 4 or, if appropriate, to several consecutive revolutions of the core 4 about the central axis X4.

Of course, it is possible, in absolute terms, to envision any appropriate means for the placement of a tire component and, for example, to envisage, according to one possible implementation variant, for the tire-building station 3 to be able to create at least one tire component from a plurality of individual strips, by laying the individual strips on the core one after the other with the individual strips being juxtaposed two by two via their edges so that the individual strips, thus combined all together, constitute a tire component of the ply type.

However, as a preference, according to another implementational variant, preference will be given to a method of laying by continuous wrapping, rather than by sequential build-up from individual strips, so as to increase the speed of laying and therefore reduce the duration of the building of the uncured annular tire at the tire-building station 3.

As a preference, of the tire components, at least one, and possibly several, contain uncured raw rubber, which is to say unvulcanized rubber.

As a preference, of the tire components, there are at least a tread, preferably based on uncured raw rubber, that forms the radially outer layer of the uncured annular tire 2A.

As a preference, of the tire components, there is also at least one, or even several, reinforcing components which will be wrapped onto the core 4 before the tread in order to form a reinforcement beneath the tread.

Of the reinforcing components, there will preferably be at least a hoop, which will be obtained by wrapping onto the core 4, about the central axis X4, helical turns of a continuous reinforcing cord or else a reinforcing strip containing, in a matrix, several continuous reinforcing cords set out parallel to one another and parallel to the longitudinal direction of the reinforcing strip. The helical turns are preferably contiguous, or even partially overlap axially from one turn to the next.

The reinforcing cord or reinforcing cords involved in the make-up of the reinforcing strip will be made from a material that will render them substantially inextensible in their longitudinal direction and therefore in the circumferential direction of the tire 2.

To that end, it is possible to envision reinforcing cords made of metal, or made of a suitable polymer, for example of aramid (Kevlar) or else even of fibreglass.

In a preferential variant embodiment, the reinforcing cord used, or the reinforcing strip used, is made from a material known as a "glass-reinforced plastic", or "GRP" for short, in which the reinforcing cords are made of fibreglass and embedded in a resin, for example resin of the vinyl ester type.

The glass-reinforced plastic may be used as it is, in a bare form, not coated with rubber, or else in a coated form, whereby the glass-reinforced plastic is encased in a raw rubber skim layer to form a coated reinforcing cord or, respectively, a coated reinforcing strip. It will be noted that, in both instances, the glass-reinforced plastic reinforcing cord will preferably have undergone a prior treatment that will promote the adhesion of the rubber to the surface of the reinforcing cord.

When the glass-reinforced plastic is employed in its bare form, the laying of the glass-reinforced plastic will be preceded and, where appropriate, followed, by the laying of a layer of raw rubber, which will preferably be obtained by wrapping helical turns of a strip of raw rubber onto the core.

Whether a glass-reinforced plastic is used in coated form or in bare form, several superposed hoops may be laid in succession by repeating a number of times the operation of wrapping the composite in a coated form or, respectively, by repeating the alternating wrapping of a strip of raw rubber followed by a wrapping of the composite in bare form, so that in each instance a layered reinforcing sublayer is achieved.

Included among the reinforcing components there will preferably also be reinforcing plies known as "crown plies". These reinforcing plies will preferably be superposed on a sublayer formed of at least one hoop, and preferably of several superposed hoops, the hoops being obtained like the one described hereinabove.

Each reinforcing ply will comprise a plurality of reinforcing threads which connect one edge of the ply to the other edge of the ply and which run parallel to one another at a predetermined non-zero angle with respect to the longitudinal direction of the ply and known as the "ply angle". By way of indication, the ply angle may preferably be comprised between 15 degrees and 35 degrees. The reinforcing threads may be made of metal, polymer fibre, for example polyamide (nylon) or aramid (Kevlar), natural textile fibre, for example cotton, fibreglass-based glass reinforced plastic, or carbon fibre.

As a preference, two reinforcing plies having different ply angles, where appropriate of opposite signs, will be superposed within the one same tire 2 so as to create a reinforcement with crossed reinforcers, which offers a high level of stiffness.

Each reinforcing ply will preferably make one and only one full revolution about the central axis X4, closing up on itself at a "welded" join.

Once the reinforcement has been formed from the reinforcing components, the raw rubber tread will then be placed on top of the reinforcement.

The tire components will be conveyed to the core 4 and positioned on the core by means of suitable laying heads 5, 7, 12 which are visible in FIGS. 1 and 2.

Provision may thus be made for the, or each, above-mentioned rubber strip to be laid by a first laying head 5 provided with a generator of the pump type 6 which extrudes the strip of rubber progressively as the rubber strip is used and wrapped onto the core 4. Where appropriate, several laying heads 5 may be provided, as visible in FIGS. 1 and 2, so that various rubber strips with different formats or different compositions can be delivered selectively.

The reinforcing cord or respectively the reinforcing strip, which in this instance is preferably made of Glass-Reinforced Plastic, may be applied to the core 4 by means of a second laying head 7 comprising an applicator roller 8 which presses the reinforcing cord or, respectively, the reinforcing strip, against the core 4.

The second laying head 7 will preferably be fed by a paying-out system 9 configured to receive a reel 10 which contains a reserve of reinforcing cord or respectively a reserve of reinforcing strip. The paying-out system 9 may comprise an accumulator 11 employing a plurality of pulleys which, by means of a predetermined separation, define a series of zigzags forming a storage path containing a buffer store of reinforcing cord or, respectively, of reinforcing strip, and the separation of which can be adjusted dynamically and, more particularly, the separation of which will be reduced as the reinforcing cord or, respectively, the reinforcing strip, is progressively consumed by the core 4 so that the storage path, and therefore the buffer store of reinforcing cord or, respectively, of reinforcing strip, within the accumulator 11 is shortened in real time so as to be able to compensate for any potential difference between the speed at which the reel 10 pays out the reinforcing cord or, respectively, the reinforcing strip, and the speed at which the reinforcing cord or, respectively, the reinforcing strip, is wrapped onto the core 4. Thus, the rate of delivery of reinforcing cord or, respectively, of reinforcing strip can be adjusted in real-time to suit the actual rate at which it is consumed, which corresponds to the speed of rotation of the core 4.

Here again, several second laying heads 7 may be provided so as to be able to deliver different reinforcing cords or reinforcing strips of several formats or several compositions, or so as to be able to ensure continuity of production by making it possible, when a first reel 10 associated with one of the second laying heads 7 runs out, for a second laying head 7 associated with a full second reel 10 to be brought into action while, as a concurrent operation, the exhausted first reel 10 is replaced.

The reinforcing plies, if any, intended to be wrapped in a single complete revolution around the core 4 and thus close upon themselves and on completion of the complete revolution, may be conveyed by a third laying head 12 which for this purpose will preferably comprise a conveyor, for example a belt conveyor 13.

To simplify the organization of the facility 1 and facilitate the use of the various tire components, the various laying heads 5, 7, 12 may be fitted individually or in groups to distinct tire-building substations 3_1, 3_2.

More particularly, as is visible in FIG. 1, there may be provided, on the one hand, a first tire-building substation 3_1 which comprises the first laying head 5 or a collection of first laying heads 5 which are intended to lay raw rubber strips and, on the other hand, a second tire-building substation 3_2 which comprises at least one second laying head 7, preferably two second laying heads 7, which are intended to lay a reinforcing strip, preferably made of bare or rubber-coated glass-reinforced plastic, and at least one third laying head 12 for layering reinforcing plies.

The laying heads 5, 7, 12 will of course be provided with movement mechanisms 14, 15, 16 so that they can be positioned suitably with respect to the core 4 present in the tire-building station 3 and more particularly in the substation 3_1, 3_2 concerned.

The first laying head 5 will therefore preferably be supported by a first positioning mechanism 14 allowing, when the core 4 is in the first tire-building substation 3_1, at least a movement parallel to the central axis X4 of the core 4 and a movement in another direction, known as "transverse axis" Y, which is perpendicular to the central axis X4 and here preferably horizontal.

A second positioning mechanism 15 will allow the second laying head 7 dedicated to the reinforcing cord or to the reinforcing strip to move parallel to the central axis X4 and transversely to the central axis X4 of the core 4 present in the second tire-building substation 3_2.

Likewise, a third positioning mechanism 16 will allow the third laying head 12 dedicated to the reinforcing plies to move at least transversely to the central axis X4 of the core present in the second tire-building substation 3_2, preferably on the one hand along the transverse axis Y, which here is horizontal, and on the other hand along a vertical axis Z, notably so as to be able to adapt the position of the third laying head 12 to suit the diameter of the core 4.

As a preference, the second and third positioning mechanisms 15, 16 will be designed to allow the second laying head 7 and the third laying head 12 to come alternately to face the core 4 present in the tire-building station 3, in this instance in the second tire-building substation 3_2. In this regard, as is visible in FIG. 1, the second positioning mechanism 15 may notably comprise a rail 15_R that is horizontal and parallel to the central axis X4 of the core, so that the second laying head 7 can be alternately moved away from and brought to face the core 4, while the third positioning mechanism 16 may comprise a rail 16_R that is horizontal and orthogonal to the central axis X4 so that the third laying head 12 can be alternately moved away from and brought to face the core 4 present in the second tire-building substation 3_2.

The facility 1 and more particularly the tire-building station 3 may further comprise a changeover device 17 configured to position the core 4 facing the appropriate tire-building substation 3_1, 3_2. The changeover device 17 may for example employ two shafts 18 which are each able to receive a core 4 and which each embody the central axis X4 of the core 4 concerned, the shafts 18 being mounted on a rotary head 19, in this instance with a horizontal axis, so as to be able to swap places respectively facing the first tire-building substation 3_1 and facing the second tire-building substation 3_2. As a preference, the shafts 18 extend horizontally, in directions parallel to one another, and are vertically offset from one another. Thus, the changeover device 17 makes it possible to maintain the overall orientation of the central axis X4 of the core 4, whatever the substation, namely the first tire-building substation 3_1 or the second tire-building substation 3_2 in which the core 4 is placed by the changeover device 17.

Figure 6:
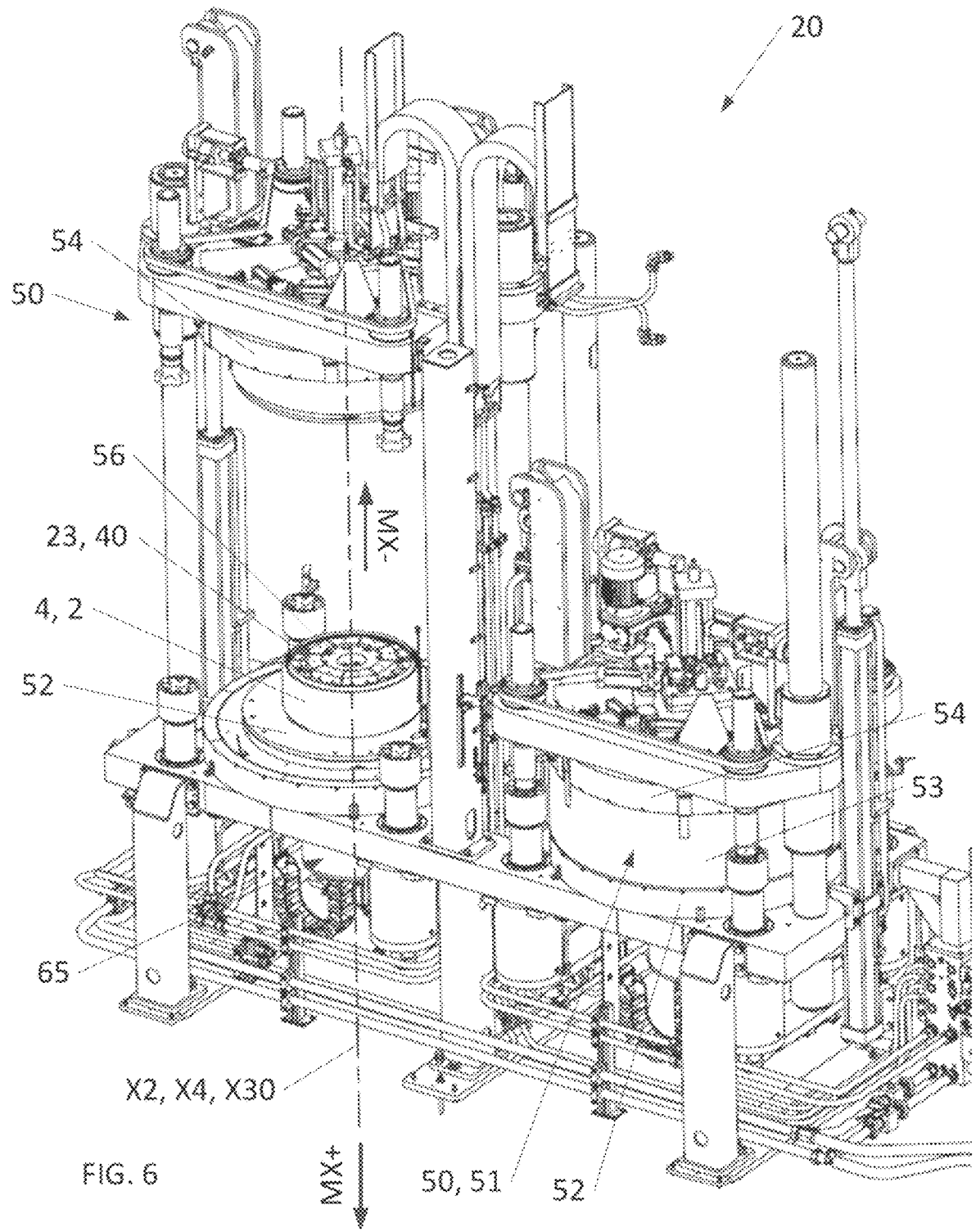
FIG. 6 depicts, in a perspective overall view, the curing station of the facility of FIGS. 1 and 2, which curing station here comprises two curing molds each able to receive a core provided with its annular tire that is to be cured.

The facility 1 also comprises a curing station 20 configured to receive the assembly formed by the core 4 and the uncured annular tire 2A supported by the core 4 and heat the assembly during a curing operation, as illustrated in FIGS. 6 and 11, so as to obtain a cured annular tire 2B.

It will be noted that, for convenience of description, the references 2, 2A and 2B denote roughly the same object, namely the annular tire 2, the references 2A and 2B simply being used to differentiate, where helpful for understanding, between the annular tire 2 in its uncured state prior to the curing operation, and, respectively, the annular tire 2 in its cured state, after the curing operation.

The curing operation here has the objective of vulcanizing the tire component or components which initially contain uncured raw rubber, such as, for example, the raw rubber strip or strips which are associated with the glass-reinforced plastic reinforcer in its bare form in order to form a laminate, or else the rubber skim of the glass-reinforced plastic reinforcer in its skim-coated form, or else the tread.

The curing operation is performed at a suitable temperature, preferably greater than 120° C., more preferentially greater than or equal to 140° C., or even greater than or equal to 150° C., and which may for example be comprised between 140° C. and 300° C., and notably comprised between 150° C. and 180° C.

The facility 1 also comprises an extraction station 21 which is configured to, after the curing operation, separate the cured annular tire 2B from the core 4, as is notably illustrated in FIGS. 14 to 18.

This separation operation will be described in greater detail later on.

Figure 3:
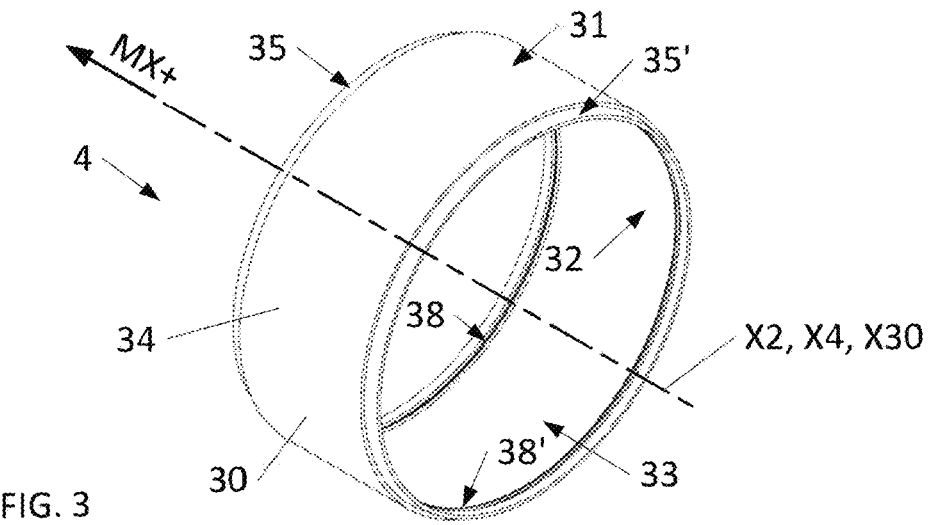
FIG. 3 depicts, viewed in perspective, a core according to the disclosure, used in the facility of FIGS. 1 and 2.
Figure 4:
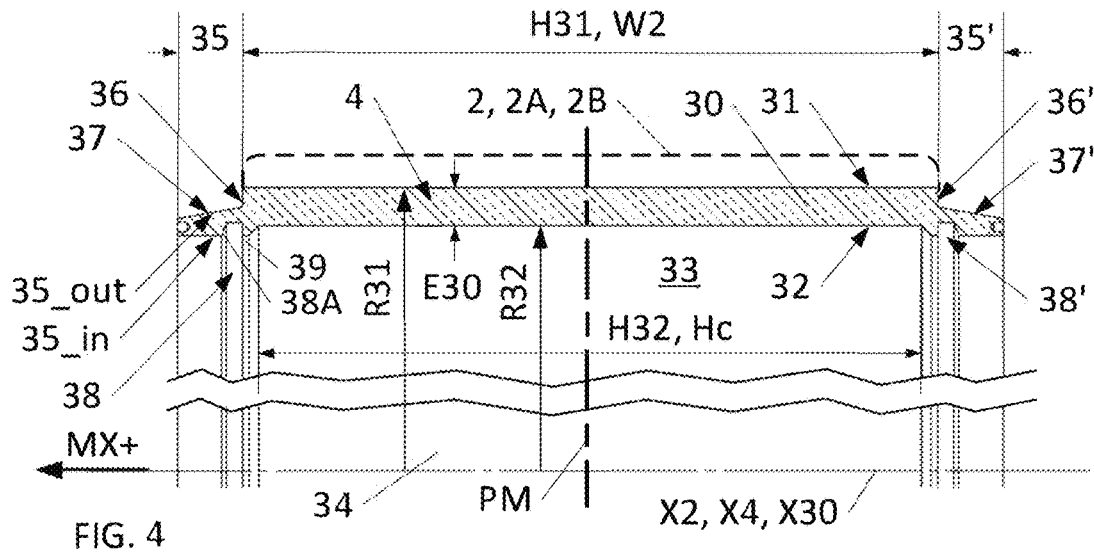
FIG. 4 is a detail view in axial section of the core of FIG. 3.
Figure 5:
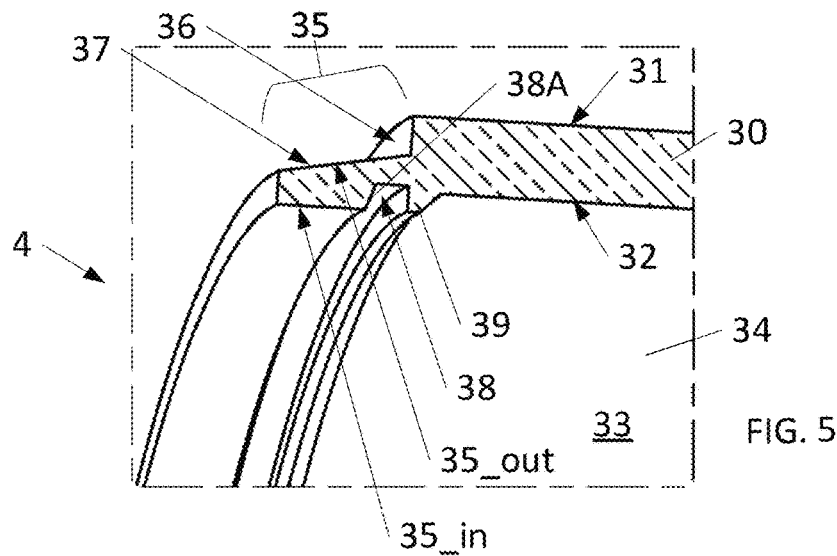
FIG. 5 is a detail view, in perspective with cutaway, of the coupling portion of the core of FIGS. 3 and 4, which coupling portion marks the axial limit of the receiving face and is configured to, on the one hand, allow the core to be grasped by a gripping tool carried on board a transfer device able to transfer the core from one station to the other and, on the other hand, allow the core to be positioned and centred within the curing station.

According to the disclosure, and as is notably visible in FIGS. 3, 4 and 5, the core 4 has a tubular wall 30 which extends along and around a central axis X30. The tubular wall 30 extends in thickness E30 radially with respect to the central axis X30 from a radially outer first annular face 31, referred to as "receiving face" 31, which is intended to receive the tire component or components, as far as a radially inner second annular face 32, referred to as "exchange face" 32, which surrounds the central axis X30 and which is intended to allow exchanges of heat between the tubular wall 30 of the core 4 and thermal sources 23, 24 external to the core 4.

The central axis X30 of the tubular wall 30 in practice coincides with the overall central axis X4 of the core 4, so that these two references can be likened to one another in what follows.

What is meant by "axial" or "axially" is a direction which is parallel to (and more specifically: collinear with, if considering the three-dimensional picture) or even coincident with the central axis X30, or respectively X4.

What is meant by "radial" or "radially" is a direction which is perpendicular to the central axis X30, or respectively X4.

What is meant by "circumferential" is a direction or an element which, at the point concerned, is perpendicular to a radius and orthogonal to the central axis and therefore is tangential to the cylindrical surface of circular base that is centred on the central axis and passes through the point concerned.

The receiving face 31 will preferably form a right cylinder and more preferentially a right cylinder of circular base, the cylinder being centred on the central axis X30 and generated by generatrices that are parallel to the central axis X30.

Although in absolute terms it is not precluded for the exchange face 32 to have an annular shape that is not strictly cylindrical, for example a slightly frustoconical shape, the exchange face 32 will preferably form a right cylinder, preferably a right cylinder of circular base, and will preferably be concentric with the receiving face 31.

As a preference, the radial distance from the receiving face 31 to the central axis X30, which distance here in practice corresponds to the radius R31 of the right cylinder that the receiving face 31 forms, which is to say the outer radius of the tubular wall 30 and therefore the inner radius of the annular tire 2, is equal to or greater than 175 mm, preferably comprised between 200 mm and 500 mm.

The preferred dimensional values indicated hereinabove will advantageously in practice make it possible to obtain an annular tire 2 of which the overall dimensions are equivalent to the dimensions usually encountered in known pneumatic tires intended to be fitted to rims having a seating diameter, against which the bead of the tire presses, of between 13 inches and 24 inches, so that existing tires, notably existing pneumatic tires, can easily be replaced with tires 2 obtained according to the disclosure, keeping the same dimensional standards.

Moreover, the axial height H31 of the receiving face 31, which in practice will correspond to the width W2 of the annular tire 2, will preferably be comprised between 80 mm and 400 mm.

The thermal sources 23, 24 will themselves be intended to supply heat to the core 4, in order to heat same, or on the contrary to remove heat so as to force the cooling of the core 4.

What is meant by "external to the core" is that the thermal sources 23, 24 do not form part of the core 4 and are therefore not incorporated into the core 4 which means that neither of them are transported with the core 4 when the latter is transferred from one station to another station. As a preference, each thermal source 23, 24 is attached to a specific station 20, 21 and is not moved from one station to another station.

Figure 13:
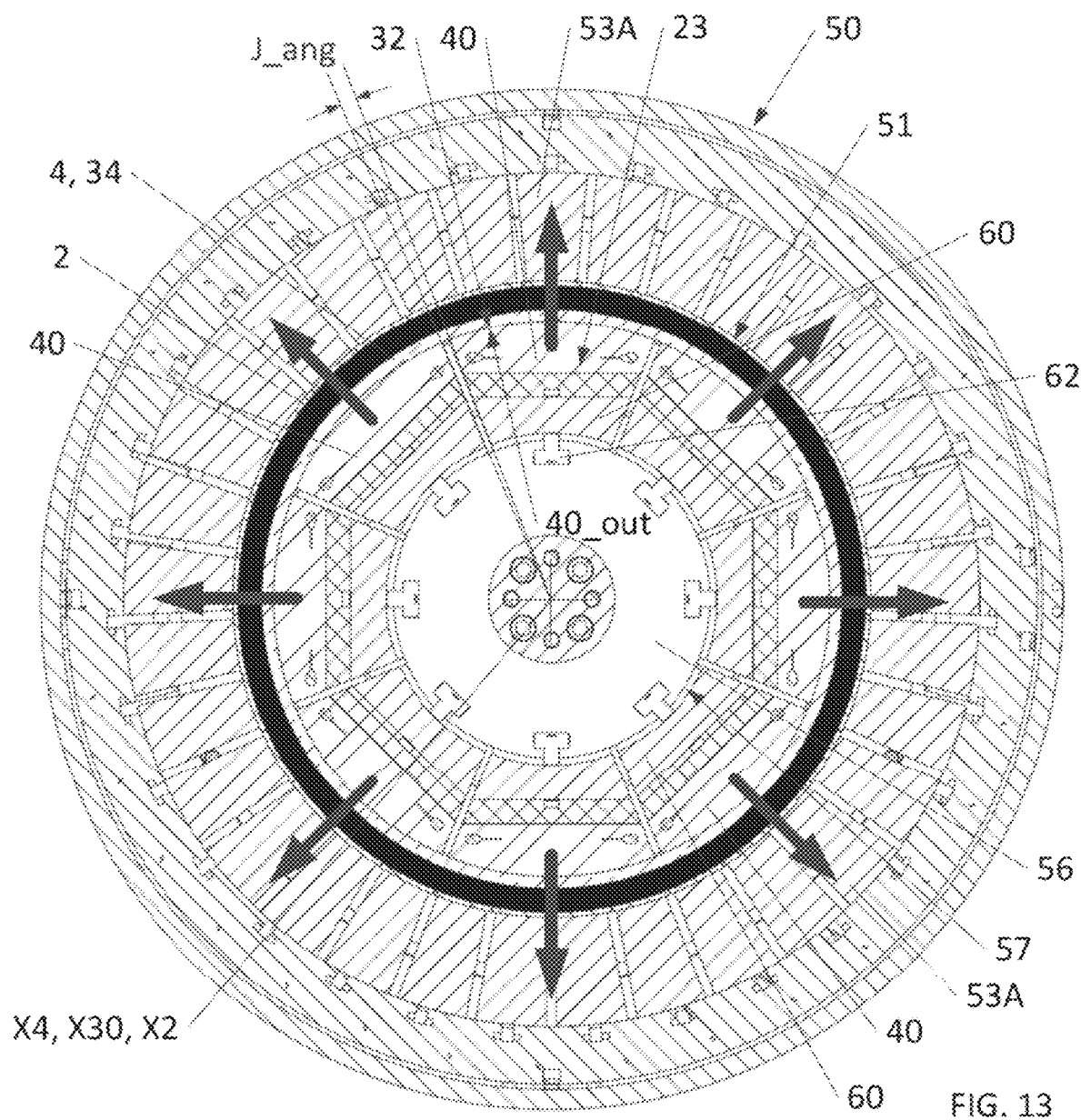
FIG. 13 is a view in cross section of the curing chamber of FIG. 11, in the same plane of section as FIG. 10.

According to the disclosure, the curing station 20 comprises a first, heating, thermal source 23 which is designed to press against the exchange face 32 of the core when the core 4 is in the curing station 20, as visible in FIGS. 11, 12 and 13, so as to heat the core 4 and the annular tire 2 during the curing operation, and then dissociate from the core 4 so as to leave the exchange face 32 free again, as visible in FIGS. 8, 9, 10 and 14, when the core 4 and the cured annular tire 2B leave the curing station 20 and are transferred to the extraction station 21 after the curing operation.

Figure 17:
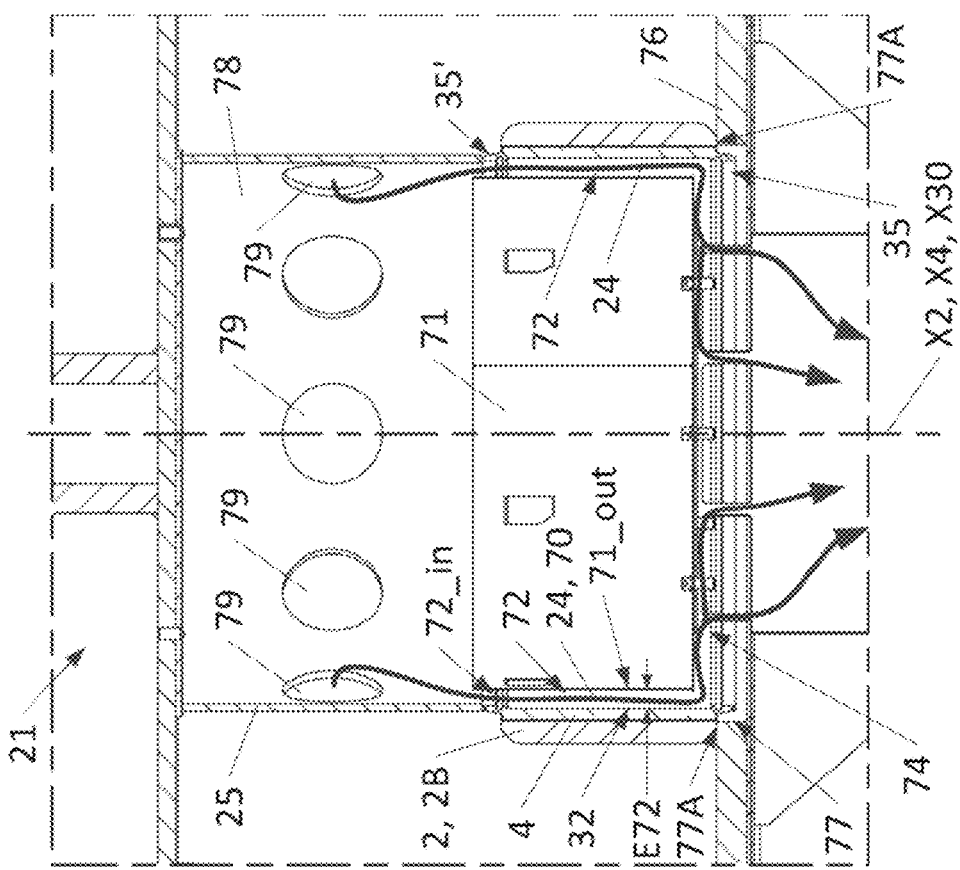
FIG. 17 is view of a detail of FIG. 15.

Furthermore, according to the disclosure, the extraction station 21 comprises a second, refrigerating, thermal source 24 which is designed so that, when the core 4 and the cured annular tire 2B are in the extraction station 21, it takes the place of the first thermal source 23 in contact with the exchange face 32 of the core so as to cool the core 4, as visible in FIGS. 14, 15 and 17.

Figure 18:
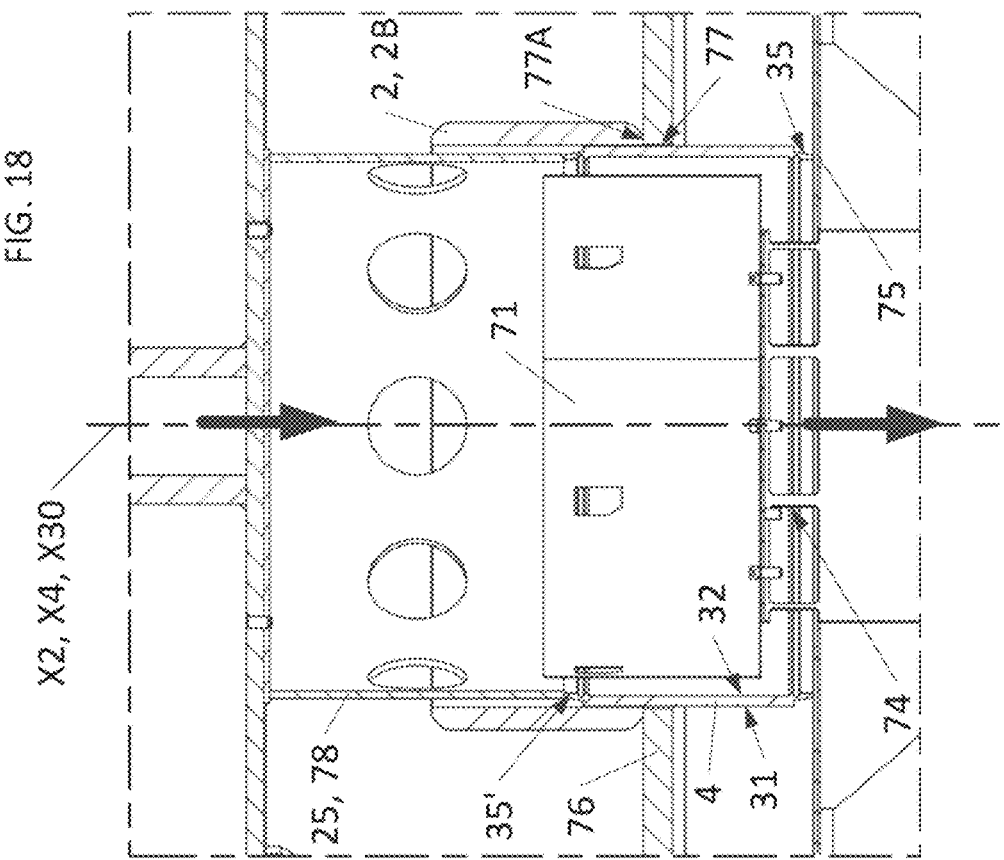
FIG. 18 is view of a detail of FIG. 16.

This cooling operation is performed in such a way as to create a radial clearance between the receiving face 31 of the core 4 and the cured annular tire 2B through differential radial contraction of the tubular wall 30 of the core 4 relative to the cured annular tire 2B, thus allowing an ejector member 25 with which the extraction station 21 is equipped to remove the cured annular tire 2B axially from the core 4, as visible in FIGS. 16 and 18.

The tubular wall 30 of the core 40 advantageously contracts more than the cured annular tire 2B, and therefore the radius R31 of the receiving face 31, which constitutes the outer radius of the tubular wall 30, decreases with respect to the inner radius of the cured annular tire 2B, on account of the fact that the core 40 is cooled more rapidly than the cured annular tire 2B which partially retains its heat since the cured annular tire 2B is not directly exposed to the second, refrigerating, thermal source 24.

As indicated above, the core 4 according to the disclosure advantageously offers the one same exchange face 32 successively to the first, heating, thermal source 23 and then to the second, refrigerating, thermal source 24, which sources take the place of one another so as to collaborate alternately, and exclusively of one another, with the exchange face 32, each within the station 20, 21 corresponding to it and, advantageously, directly against the tubular wall 30 and therefore directly on the back of the receiving face 31 and therefore in the immediate vicinity of the tire 2 which is separated from the exchange face 32 only by the thickness E30 of the tubular wall 30.

Advantageously, the core 4 can therefore, by comparison with the cores used in the prior art, be relieved of the mass and of the volume of the thermal sources and, more particularly, of the heating sources which hitherto have been integrated therein.

Furthermore, the action of the second, refrigerating, thermal source 24 is thus neither slowed nor impeded by a residual presence of the first, heating, thermal source 23 because the first thermal source 23 is absent from the core 4 when the second thermal source 24 comes into action, and vice versa, the action of the first, heating, thermal source 23 is not penalized by a residual presence of the second, refrigerating, thermal source 24 because the latter is absent from the core 4 when the first, heating, thermal source 23 comes into action. The thermal sources 23, 24 of the disclosure, although performing antagonistic functions, one consisting in heating and the other in cooling, therefore do not impede one another and in particular do not slow the respective actions of one another.

In that way, the core 4 may exhibit a lightweight structure which optimizes heat exchanges and therefore makes it possible to significantly reduce the amount of energy needed in a manufacturing cycle, as well as the duration of the manufacturing cycle.

By way of indication, the thickness E30 of the tubular wall 30 of the core 4, which radially separates the exchange face 32 from the receiving face 31, will preferentially be less than or equal to 40 mm, preferably less than or equal to 25 mm, preferentially less than or equal to 20 mm, or even less than or equal to 15 mm and for example equal to 12 mm.

More preferentially, the thickness E30 will be comprised between 6 mm and 40 mm, or between 6 mm and 30 mm, more preferentially still between 8 mm and 25 mm, between 8 mm and 20 mm, or even between 10 mm and 15 mm.

Such a range of thicknesses E30 for the tubular wall advantageously offers a good compromise between low thermal resistance, which is lower the thinner the tubular wall 30, and sufficient structural stiffness of the tubular wall 30, and more generally sufficient structural stiffness of the core 4, which is higher the thicker the tubular wall 30 is.

In this respect, it will be noted that, advantageously, the intrinsic stiffness of the tubular wall 30 is sufficient that there is no need to provide internal stiffeners inside the bore 33 that the exchange face 32 delimits, thereby making it possible to leave the bore 33 completely clear, offering optimal access to an exchange face 32 the extent of which is maximized.

Of course, the above-mentioned dimensional features regarding the thickness E30 of the tubular wall 30 are preferably combined with the above-mentioned choice regarding the radial distance R31 from the receiving face 31 to the central axis X30, which is preferably equal to or greater than 175 mm, and preferably comprised between 200 mm and 500 mm.

The various thickness and radius dimensions mentioned above preferably correspond to dimensions considered at rest and "when cold", namely when the core 4 is unstressed and at ambient temperature, typically between 20° C. and 25° C.

As a preference, and still with the aim of maintaining a good compromise between sufficient structural stiffness and minimized thickness E30 and therefore minimized thermal resistance of the tubular wall 30, the ratio R32/R31 between, on the one hand, the inner radius R32, which is to say the radius of the exchange face 32 as considered with respect to the central axis X30, X4 and, on the other hand, the outer radius R31, which is to say the radius of the receiving face 31 as considered with respect to the central axis X30, X4, will be equal to or greater than 80%, preferably equal to or greater than 85%, or even equal to or greater than 90%, and for example comprised between 91% and 97%, or even comprised between 95% and 97%.

If the face 31, 32 concerned has the shape of a cylinder of circular base and constant radius, then the radius R31, R32 concerned will be the constant radius of the circular base. If not, for example if the inner face 32 has reliefs such that its distance to the central axis X30 varies according to the azimuthal position concerned about the central axis X30, then in order to establish the above ratio R32/R31 it is possible to consider the mean radius of the face 31, 32, which is to say the mean of the distances of all the points on the relevant face 31, 32 from the central axis X30.

Moreover, in order to make it possible to maximize the surface area of the exchange face 32 on the back of the receiving face 31, and thus make most effective use of the power of the thermal sources 23, 24 which turn by turn use this exchange face 32, the core 4 will preferably be configured so that the exchange face 32 effectively available for the application of the thermal sources 23, 24 axially overlaps the receiving face 31 over an axial height referred to as "common height" Hc which represents at least 85%, preferably at least 90%, or even at least 95% of the axial height H31 of the receiving face 31, as visible in FIG. 4.

This common height Hc is here equal to the axial height H32 of the exchange face 32, and more particularly to the axial height H32 of that portion in the shape of a right cylinder of circular base and constant radius R32 from the exchange face 32 that is free, accessible and reserved for the thermal sources 23, 24, as visible in FIG. 4.

Moreover, as notably visible in FIG. 3, 4, 5, 10, 13 or 19, the receiving face 31 of the core 4 is preferably formed as a single piece so as to exhibit continuity of material all around the central axis X30, X4.

In other words, the receiving face 31 is preferably continuous over 360 degrees around the central axis X30, so as to have no partitioning and therefore no junction plane when travelling along the receiving face 31 by making a circuit about the central axis X30.

This then yields, once the cured annular tire 2B has been extracted from the core 4, an inner face of the annular tire 2 that exhibits an excellent surface finish, without flash or other undesirable evenness defects, something which will then allow the spokes to be coupled and fixed directly against the inner face of the annular tire without the need to perform beforehand a machining operation of the flash-removal or surfacing type on the inner face of the annular tire 2.

As a preference, the tubular wall 30 and more generally the core 4 may form a part exhibiting symmetry of revolution made as a single piece that forms a closed uninterrupted contour about the central axis X30, X4.

Preferentially, and as visible in FIGS. 3, 4, 10, 19 and 20, the core 4 is made up, for more than 90% of its mass, preferably for more than 95% of its mass, more preferentially for more than 98% of its mass, or even for the entirety (i.e. 100%) of its mass, of a single one-piece shell ring 34 of circular base centred on the central axis X30, X4 and which comprises at least the tubular wall 30.

The core 4 will thus have a structure that is particularly simple, robust and inexpensive to manufacture.

The tubular wall 30 preferably has a solid thickness E30, which is to say that the ratio between the volume of any voids (cavities) and the volume of solid material, in the region of the space extending between the exchange face 32 and the receiving face 31, is zero, or substantially zero, which is to say in this instance at least less than 5% or even less than 1%. This will notably make it possible to ensure effective heat transfers, and notably effective application of heat by conduction through the thickness E30 of the tubular wall 30.

In a preferential embodiment variant, the thickness E30 of the tubular wall 30 will be constant, the profile of the exchange face 32, considered in an imaginary plane normal to the central axis X30, X4, having the same shape as the profile of the receiving face 31, preferably a circular profile of constant radius.

The bore 33 of the shell ring 34 will preferably be completely clear, and notably free of any added stiffness attached to the inner face of the shell ring 34 and more particularly free of any stiffness attached to the inner face of the tubular wall 30.

As a preference, as is clearly visible in FIGS. 3 and 4, the bore 33 will pass axially right through the core 4, thus being open at both axial ends of the core 4. This will make access by the thermal sources 23, 24 to the exchange face 32 via the inside of the core 4 particularly easy.

By way of indication, given the thinness of the tubular wall 30 and more generally given the thinness of the shell ring 34, the free volume of the bore 33 inside the core 4 may preferably represent more than 85%, preferably at least 90% of the total overall volume occupied by the core 4. The overall volume here corresponds to the volume of the cylinder radially delimited by the radially outer wall of the core 4, and so therefore here of the shell ring 34, and which extends axially from a first imaginary base plane normal to the central axis X4 and tangential to the first axial end of the core 4, in this instance of the shell ring 34, as far a second imaginary base plane normal to the central axis X4 and tangential to the second axial end of the core 4, in this case of the shell ring 34, which is axially opposite to the first end.

The tubular wall 30, and preferably more generally the shell ring 34, will be made from a material selected so as to exhibit good thermal conductivity, typically equal to or greater than 20 W m$^{-1}$ K$^{-1}$ at 20° C., preferably equal to or greater than 40 W m$^{-1}$ K$^{-1}$ at 20° C., or even equal to or greater than 100 W m$^{-1}$ K$^{-1}$ at 20° C., and for example comprised between 150 W m$^{-1}$ K$^{-1}$ and 200 W m$^{-1}$ K$^{-1}$ at 20° C.

Moreover, in order to exhibit good structural stiffness, the material of which the tubular wall 30 is made, and more generally the material of which the shell ring 34 is made, will preferably have a tensile Young's modulus greater than or equal to 70 000 MPa.

As a preference, the tubular wall 30, preferentially the shell ring 34, particularly if the shell ring 34 forms the core 4 in its entirety as a single piece, will be made from a metal alloy, for example an aluminium alloy.

Preferentially, and as is visible notably in FIGS. 3, 4, 5, 9 and 12, the core 4 has, in the axial continuation of the receiving face 31, projecting axially from the receiving face

31, an annular coupling portion 35 which exhibits at least one of the following two arrangements, and preferably each of the following two arrangements: (i) a first arrangement whereby the coupling portion 35 exhibits, on its radially outer face 35_out, on the one hand, a shoulder 36 which is radially re-entrant with respect to the receiving face 31, which shoulder 36 thus forms an axial limit of the receiving face 31 and an axial end stop able to halt a movement of axial introduction MX+ of the core 4 into at least one of the stations 3, 20, 21 and, on the other hand, a frustoconical portion 37 that axially precedes the shoulder 36 on the opposite side to the receiving face 31, so as to centre the core 4 with respect to the station during the introduction movement MX+, and (ii) a second arrangement whereby the coupling portion 35 exhibits, on its radially inner face 35_in which axially prolongs the exchange face 32, away from the exchange face 32, one or more gripping depressions 38, such as an annular groove 38, provided so as to allow the core 4 to be grasped by a gripping tool 108 carried on board a transfer device 100 allowing the core 4 to be transported from one station to the other.

As a preference, the annular coupling portion 35 is formed as a single piece with the tubular wall 30. As a result, the coupling portion 35 preferably forms an integral part of the shell ring 34.

Figure 9:
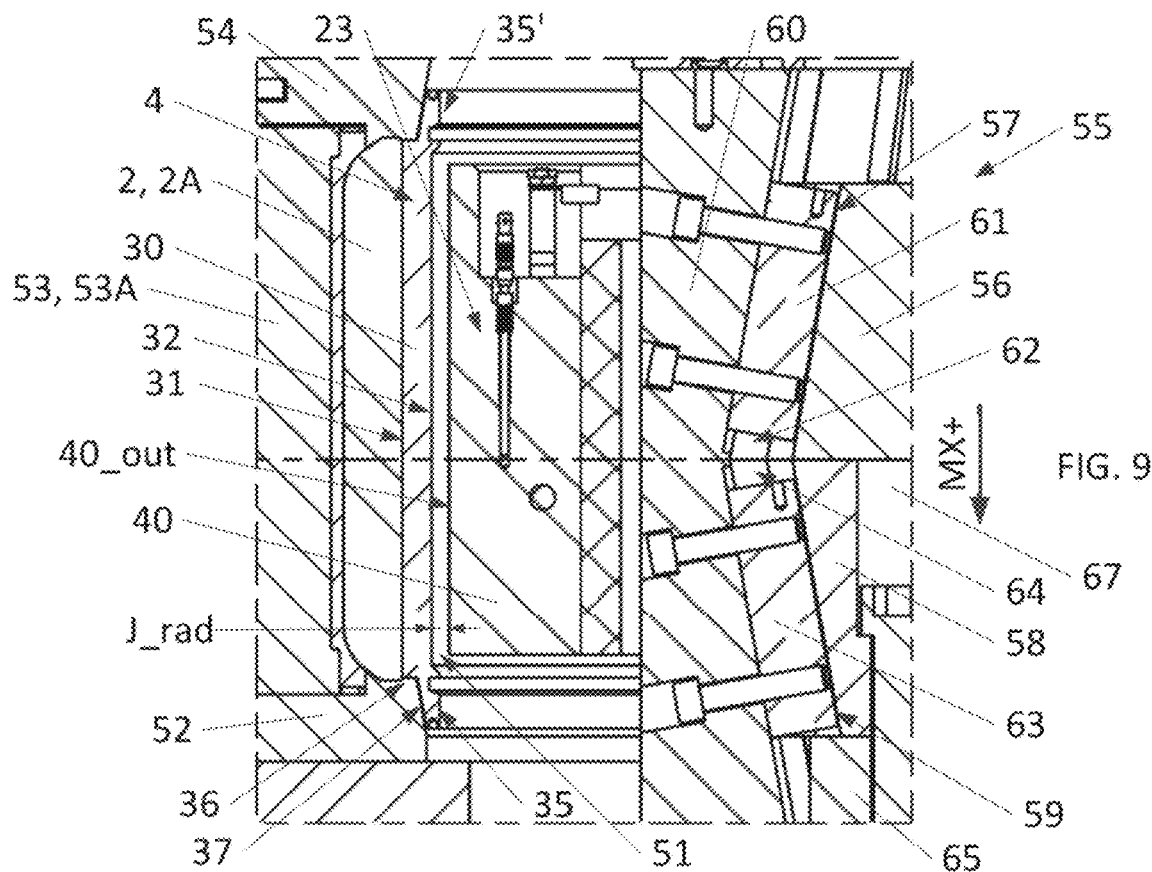
FIG. 9 is a view of a detail of FIG. 8, more clearly showing the radial clearance provided between the heating segments and the exchange face of the core in the retracted configuration.

As is clearly visible in FIGS. 4, 5 and 9, the frustoconical portion 37 is connected to the tubular wall 30 via its large base, so that the radially outer face 35_out of the coupling portion has a shape that converges towards the central axis X30, X4 with progressively increasing distance away from the receiving face 31 and from the corresponding shoulder 36 heading towards that axial end of the core 4 that is closest to the receiving face 31 and therefore closest to the shoulder 36.

It will be noted that the first arrangement, which envisions a frustoconical portion 37 associated with a shoulder 36, is preferably used notably for suitably positioning the core 4 within the curing station 20.

As a preference, the annular groove 38 will be situated axially outside of and beyond the receiving face 31 so as not to encroach upon the useful surface area situated radially on the back of the receiving face 31, and which is reserved for the exchange face 32. According to one configuration possibility, the annular groove 38 may begin in radial alignment with the shoulder 36, and more particularly in radial alignment with the intersection between the shoulder and the frustoconical portion 37. Thus, more generally, it will be noted that the coupling portion 35 advantageously does not interfere with the axial space of the core 4 which corresponds to the tubular wall 30, so as not to encroach upon the receiving face 31 and exchange face 32 and consequently not reduce the surface area of the faces 31, 32 nor interfere with the operation thereof.

Furthermore, the inner face of the shell ring 34 may also have, preferably at the transition between the exchange face 32 and the annular groove 38, a collar 39 projecting radially into the inside of the bore 33. The presence of the collar 39 notably makes it possible to avoid a weakening of the core 4 in the radial alignment with the cutout formed by the shoulder 36. The collar 39 may also contribute to making it easier for the gripping tool 108 to mate with the annular groove 38 by embodying a wall of the annular groove 38. Still with the objective of making it easier for the gripping tool 108 to mate with and engage in the annular groove 38, the wall of the annular groove 38 that is situated axially on the opposite side from the collar 39 may preferably form a slope 38A that converges towards the bottom of the annular groove 38, in the direction of the collar 39.

According to one particularly preferred embodiment possibility, the shell ring 34, and more generally the core 4, has a shape exhibiting symmetry about a midplane PM that is normal to the central axis X4, X30 and that intersects the receiving face 31 halfway up the axial height H31 thereof, which is to say in practice a midplane that corresponds to the equatorial plane of the annular tire 2. That being the case, it would also be possible, in absolute terms, to envision a variant of shell ring 34 that was not symmetrical with respect to the midplane PM.

In any event, it will be noted that the shell ring 34 preferably comprises, as visible in FIGS. 3 and 4, two coupling portions 35, 35', each situated at one of the axial ends of the core 4, axially one on each side of the tubular wall 30.

Each of the coupling portions 35, 35' will preferably be provided, as indicated hereinabove, with a shoulder 36, 36', with a frustoconical portion 37, 37' and with a gripping depression such as an annular groove 38, 38'

As a particular preference, the second coupling portion 35' will have an arrangement that is symmetrical with the arrangement of the first coupling portion 35 about a plane normal to the central axis X4, preferably about the midplane PM.

Advantageously, the choice of a symmetrical layout of the shell ring 34, and more particularly of the coupling portions 35, 35', will allow the core 4 to be produced in a particularly simple shape but also will allow the core 4 to be grasped, manipulated and used in either one direction about the central axis X4, X30, and this will make the core 4 and, more generally, the method of manufacture according to the disclosure, easier to implement.

As a preference, the maximum radial thickness of each coupling portion 35, 35' will not exceed the thickness E30 of the tubular wall 30. More preferentially, and more generally, the shell ring 34 will have, at any point on the axial length occupied by the shell ring 34, a wall thickness that is equal to or less than the thickness E30 of the tubular wall 30, that is to say a thickness that will be equal to or less than 40 mm, preferably equal to or less than 25 mm, or even equal to or less than 15 mm. Thus, the shell ring 34 that forms the core 4 will be particularly thin and lightweight.

According to one possible preferential sizing criterion, the shell ring 34, or preferentially the core 4 in its entirety, will be wholly contained within an imaginary measurement envelope that is formed by a portion of the right cylinder of circular base centred on the central axis X4, X30 and which extends from a first inner envelope radius the value of which is comprised between 135 mm and 480 mm, which first inner radius in practice corresponds to the radius of the narrowest passage of the bore 33 and therefore preferentially to the inner radius of the coupling portion 35 (if appropriate, the smallest inner radius of the coupling portion if the inner radius of the coupling portion varies along or around the axis), as far as a second outer envelope radius the value of which is equal to the value of the inner envelope radius increased by a value referred to as "radial envelope thickness" which is non-zero, preferably greater than or equal to 8 mm, or even equal to or greater than 10 mm, and in any event less than or equal to 50 mm, preferably less than or equal to 30 mm, or even less than or equal to 20 mm.

As a preference, the first thermal source 23, used by the curing station 20, comprises a plurality of heating segments 40, the heating segments 40 being designed in such a way as to be pressed against the exchange face 32 from the inside of the core 4.

Each heating segment 40 advantageously forms a solid block which covers an angular sector representing a portion of the circumference of the exchange face 32 and of which the radially outer face 40_out, that comes into contact with the exchange face 32, pressing radially centrifugally, preferably has a curved shape, in this instance, concave overall and for example in the form of an arc of a cylinder, which is the conjugate of the shape of the exchange face 32, in this instance generally concave, so as to hug the exchange face 32. In this respect, the radius of curvature of the radially outer face 40_out of the heating segment, considered in a plane normal to the central axis X4, is preferably equal to the radius R32 of the exchange face 32.

Figure 10:
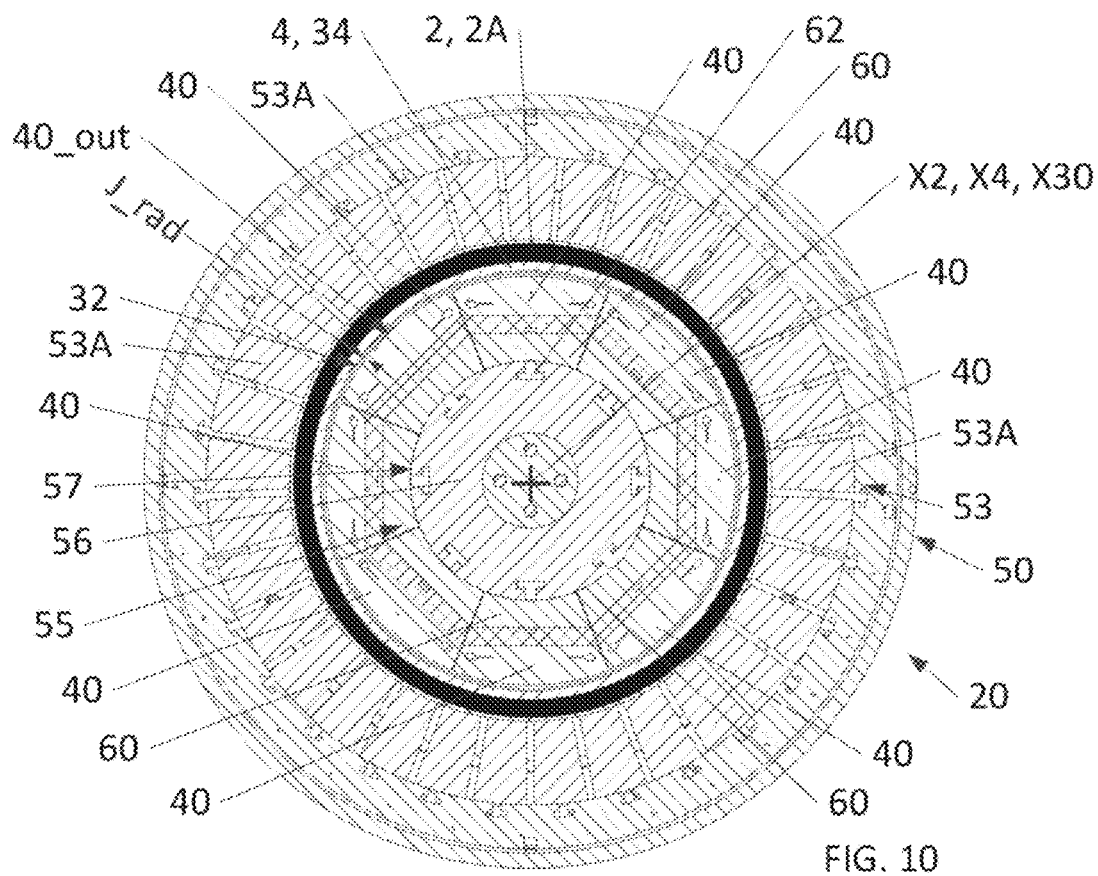
FIG. 10 is a view in cross section of the curing chamber of FIG. 8, in a plane of section normal to the axis of the core and which here corresponds to the equatorial plane of the annular tire.

As a preference, the first thermal source will comprise from six to twelve heating segments 40, preferably eight heating segments 40, distributed in the azimuthal direction, preferably equally distributed in the azimuth direction all around the central axis X4, X30 facing the circumference of the exchange face 32, as visible in FIGS. 10 and 13.

As a preference, the heating segments 40 will be identical to one another, for convenience of embodiment and with a view to interchangeability.

Figure 7:
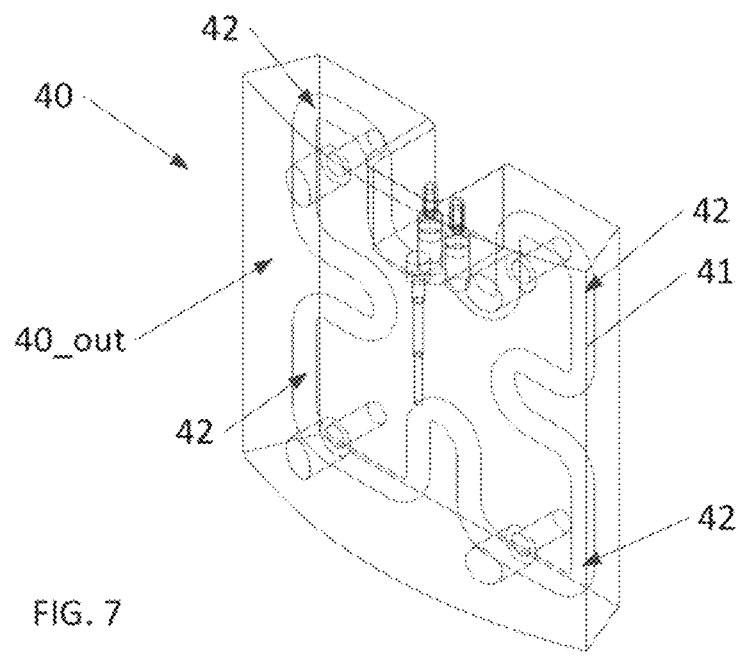
FIG. 7 illustrates, viewed in perspective, a heating segment belonging to a collection of heating segments which constitute the first, heating, thermal source used within the curing station. The heating segment here is equipped with a resistive electrical heating element depicted here as hidden detail.

As a preference, the heating segments 40 each bear at least one heating resistive electrical element 41, as is notably visible as hidden detail in FIG. 7.

The heating resistive electrical element 41 will be designed and dimensioned to be able to raise the heating segment 40 to, and maintain it at, a temperature deemed adequate for curing the annular tire 2, typically in a temperature range as mentioned above, and therefore for example at a temperature comprised between 150° C. and 180° C.

As a preference, the routing of the heating resistive electrical element 41 through the heating segment 40 is not rectilinear but follows a winding path with preferably several loops 42, so as to best cover the radially outer surface 40_out and, more generally the volume, of the heating segment 40.

Whatever the shape of the first thermal source 23, and in particular when the latter comprises heating segments 40 as described hereinabove, the first thermal source 23, and more particularly the heating segments 40, are designed in such a way as to occupy, during the curing operation, and then free up after the curing operation, a contact area on the exchange face 32, referred to as "useful heating area", which represents axially at least 80%, preferably at least 85%, preferentially at least 90% or even at least 95% of the axial height H31 of the receiving face 31 that is covered by the annular tire 2 and angularly, in terms of azimuthal coverage about the central axis X30, at least 270 degrees, preferably at least 300 degrees, or even at least 330 degrees.

Thus, the first heating source 23 and more particularly the heating segments 40 will cover almost all of the back of the receiving face 31, thereby maximizing the effectiveness of the application of heat to the annular tire 2 by conduction through the tubular wall 30.

It will be noted that the combined angular coverage of the heating segments 40, considered in their entirety, about the central axis X4, X30 will advantageously be as extensive as possible, and therefore as close as possible to full 360-degree coverage. Specifically, the only interruptions in the combined angular coverage will correspond to the segmentation clearances J_ang which separate pairs of adjacent heating segments 40, when the heating segments 40 are in contact with the exchange face 32, as visible in FIG. 13. As a preference, the segmentation clearances J_ang will each be less than 10 degrees, preferentially each less than 5 degrees, or even each less than 3 degrees, and for example each equal to 2 degrees.

Advantageously, the disclosure makes it possible to make best use of the exchange face 32, both for curing and for the cooling required for extraction.

As a preference, the core 4 and the first and second thermal sources 23, 24 will therefore be dimensioned in such a way as to (i) on the one hand maximize the ratio between, in the numerator, the surface area of the exchange face 32, considered as being the cylinder the radius of which is equal to the mean radius R32 of the exchange face 32 and the axial height of which is equal to the common height Hc over which the exchange face 32 axially overlaps the receiving face 31 and, in the denominator, the surface area of the receiving face 31, considered as being the cylinder the radius of which is equal to the mean radius R31 of the receiving face and the height of which is equal to the axial height H31 of the receiving face, and (ii) on the other hand maximize the proportion of the exchange face 32 that is effectively used by the thermal sources 23, 24.

Thus, as a preference, the core 4 as well as the curing station 20 and extraction station 21, and the respective thermal sources 23, 24 thereof, are configured in such a way that, over the course of a manufacturing cycle for the manufacture of a tire 2, the first thermal source 23 of the curing station 20 alternately covers and then uncovers a first surface area of the exchange face 32, referred to as the "useful heating surface area", then the second thermal source 24 of the extraction station 21 alternately covers and then uncovers a second surface area of the exchange face 32, referred to as the "useful refrigerating surface area", and that the ratio between, on the one hand, the smaller of the first and second useful surface areas of the exchange face and, on the other hand, that surface area of the receiving face 31 that is covered by the manufactured tire is equal to or greater than 70%, preferably equal to or greater than 80%, or even equal to or greater than 90%. In practice, in order to meet this criterion, it is notably necessary to ensure, cumulatively, that the thickness E30 of the tubular wall is below a certain threshold, proportional to the radius R31 of the receiving face 31, that the common height Hc over which the exchange face 32 and the receiving face 31 axially overlap exceeds a predetermined percentage of the axial height H31 of the receiving face 31, and that each of the first and second thermal sources collaborates with a proportion of the total available surface area of the exchange face 32 which is above a given threshold.

According to a preferred feature, which may constitute a separate disclosure in itself, the curing station 20 comprises a curing mold 50 which is designed to delimit a closed curing chamber 51 inside which the assembly formed by the core 4 and the uncured annular tire 2A is placed in order to perform the curing operation, and the disclosure allows the core 4 to "jettison" the first, heating, thermal source 23 after the curing operation and leave the first, heating, thermal source 23 "abandoned" so to speak in the curing station 20, and more particularly allows the first, heating, thermal source 23 to be stored, after removal from the core 4, in the closed curing chamber 51, at a temperature referred to as "standby temperature" which is relatively high, preferably close to the curing temperature, for example comprised between 150° C. and 180° C., and in any event at a standby temperature that is strictly higher, in this instance very much higher, than the temperature to which the core 4 is cooled in the extraction station 21. Thus, the first, heating, thermal source 23, in this instance more specifically the heating segments 40, can be sheltered within the curing chamber 51 and therefore maintain a high temperature without an appreciable input of energy, while awaiting the next curing operation, whereas elsewhere the core 4 will be cooled and separated from the cured annular tire 2B in the extraction station 21. This then avoids the heating thermal source 23 losing energy between two successive curing operations.

As is notably visible in FIGS. 6 and 8 to 13, the curing station 20 preferably comprises a curing mold 50 designed to delimit a curing chamber 51 which is intended to receive and contain the assembly formed by the core 4 and the uncured annular tire 2A in order to perform the curing operation.

The curing mold 50 for that purpose comprises a lower plate 52, on which the core 4 is rested, an outer ring 53 designed to surround the radially outer face of the tire 2 that is to be cured, and an upper plate 54 which collaborates with the outer ring 53 at the axially opposite end from the lower plate 52 so as to close the curing chamber 51.

As a preference, the upper plate 54 and the outer ring 53 will be fixed to one another in such a way as to form one same piece of moving equipment, of the removable cover type, which will close down onto the lower plate 52 and, more particularly, onto the core 4 placed on the lower plate 52 beforehand, so as to cover the core 4 supporting the annular tire 2 that is to be cured.

The moving equipment will preferably be guided in translation along the central axis X4, X2, preferably in this instance in vertical translation as visible in FIG. 3.

As a variant, provision could be made for the outer ring 53 to remain on the lower plate 52 and only the upper plate 54 to form the axially mobile removable cover.

Whatever the variant adopted, the outer ring 53 preferably comprises a plurality of blocks 53A distributed in the azimuth direction all around the central axis X4, X30 and which, facing the cavity of the curing mold 50 accommodating the annular tire 2, exhibit the negative impression of the tread patterns that are to be conferred upon the tread of the cured annular tire 2B.

As indicated above, the first thermal source 23 comprises a plurality of heating segments 40, preferably each bearing at least one heating resistive electrical element 41.

Figure 8:
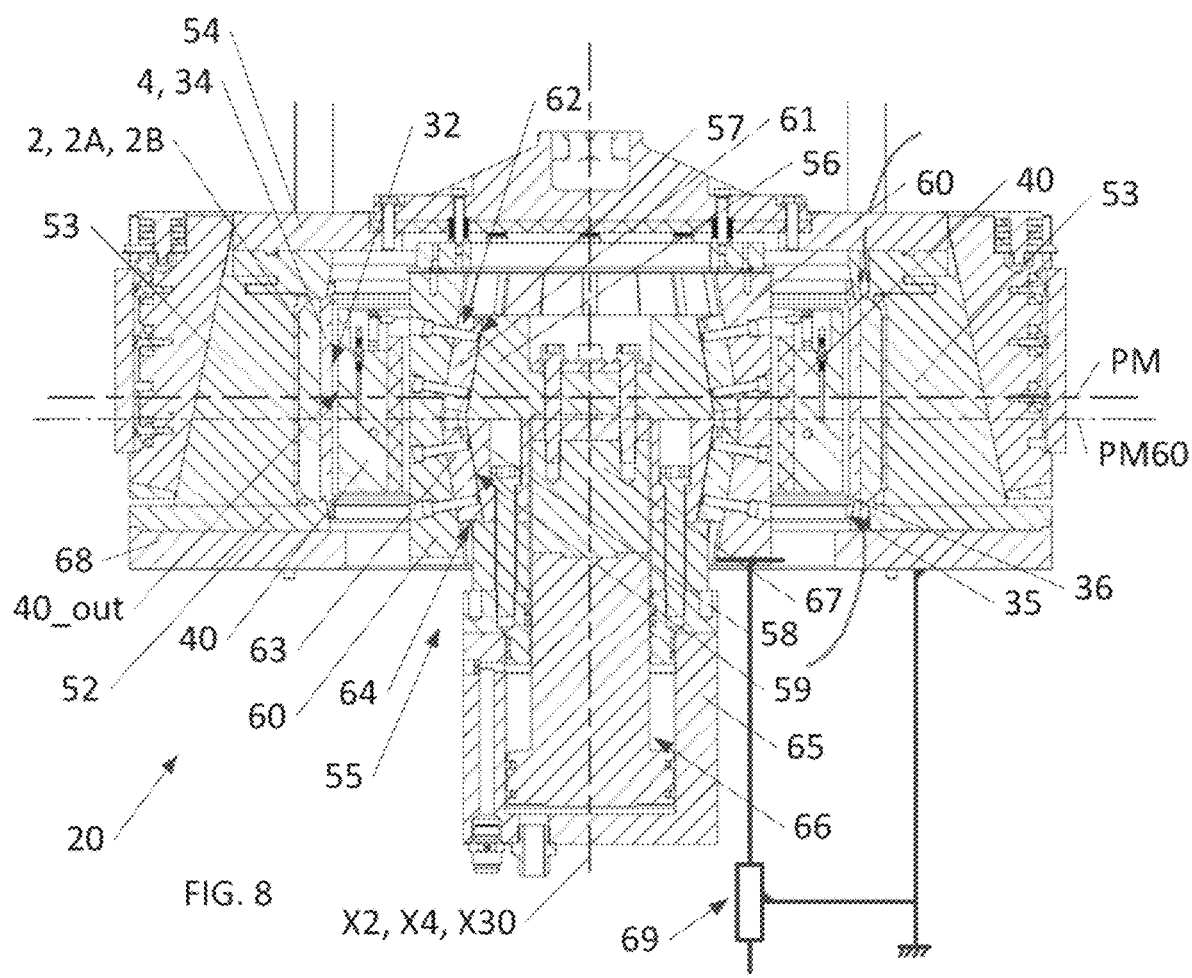
FIG. 8 illustrates, viewed in axial section through one of the molds of the curing station, the deployment mechanism with two antagonistic concentric pushers allowing the heating segments to be moved radially in order alternately to press the segments against the exchange face, in order to perform the curing operation and then, after the curing operation, bring the segments back away from the exchange face in order to allow the core to be removed, and then later engage another core with a view to performing another curing operation. In this figure, the segments are in the retracted configuration, set back radially with respect to the exchange face of the core.

The heating segments 40 are preferably positioned at the centre of the curing chamber 51 and placed under the dependency of a deployment mechanism 55 which is designed to place the heating segments 40 alternately in a deployed configuration in which the heating segments 40 are compressed in a centrifugal radial direction firmly against the exchange face 32 of the core 4, as illustrated in FIGS. 11, 12 and 13, and a retracted configuration in which the heating segments 40 are positioned radially set back from the exchange face 32, as illustrated in FIGS. 8, 9 and 10, so that, after the curing operation, the core 4 can be removed from the curing chamber 51 by causing the core 4 to move axially relative to the heating segments 40 and the heating segments 40 can be left behind in the curing station 20 and more preferably the heating segments 40 can be left waiting inside the curing chamber 51 while the core 4 bearing the cured annular tire 2B coming from the curing chamber 51 is conveyed to, and then cooled by, the extraction station 21.

In the retracted configuration, a non-zero radial clearance J_rad, preferably comprised between 5 mm and 8 mm, is created between the location of the radially inner exchange face 32 of the core 4 and the radially outer faces 40_out of the heating segments 40, as is very clearly visible in FIG. 9.

This non-zero radial clearance J_rad is advantageously sufficient to allow the core 4 bearing the annular tire 2 to slide axially relative to the heating segments 40 and to axially overlap the heating segments without snagging on the heating segments.

More particularly, this non-zero radial clearance J_rad is enough to allow the core 4, and the uncured annular tire 2A, to be engaged prior to the curing operation around the collection of heating segments 40, between the radially outer faces 40_out of the heating segments 40 and the site of the radially inner face of the ring 53, by performing an axial introduction movement MX+ which is halted when the shoulder 36 of the core 4 comes into abutment against the lower plate 52 so that the heating segments 40 are inside the bore 33 of the core, facing the exchange face 32.

This same non-zero radial clearance J_rad is also sufficient to subsequently allow, after the curing operation, the core 4 and the cured annular tire 2B to be removed clear of the collection of heating segments 40, in an axial removal movement MX−, here in the opposite direction to the introduction movement MX+.

In the deployed configuration, this radial clearance J_rad is absorbed until it becomes zero, as can be seen in FIG. 12, so that during the curing operation, the heating segments 40 come into contact with the exchange face 32, advantageously via the entire surface area of their radially outer faces 40_out.

It will be noted that, as a preference, the curing chamber 51 is opened, here preferably by placing the moving equipment comprising the upper plate 54 and the outer ring 53 in an open configuration as illustrated in the left-hand part of FIG. 3, only when it is necessary to access the inside of the curing chamber 51 in order to introduce into the curing chamber 51 a core 4 supporting an uncured annular tire 2A with a view to performing the curing operation or, on the other hand, in order to extract from the curing chamber 51 a core 4 supporting a cured annular tire 2B after the curing operation, whereas for the rest of the time the curing chamber 51 is otherwise in the closed configuration so as to cover all the heating segments 40, in this instance preferably by bringing the moving equipment back against the lower plate 52 as illustrated in the right-hand part of FIG. 3.

Thus, the curing chamber 51 is kept closed both during the course of the curing operation, during the course of which the curing chamber 51 is the to be "full" insofar as it contains not only the heating segments 40 but also the core 4 supporting the annular tire 2, and during the phases of standby between two consecutive curing operations, during which phases the curing chamber 51 is the to be "empty" and notably "empty of a core" insofar as it no longer contains a core 4, although it does still contain the collection of heating segments 40. Keeping the heating segments 40 hot in this way advantageously makes it possible to avoid heat loss and therefore needless overconsumption of energy.

As a preference, the deployment mechanism 55 comprises a first pusher 56 mounted with the ability to move axially and having a plurality of first ramps 57 which are inclined in a first direction of inclination with respect to the main axis X4, X30 and which each collaborate with a heating segment 40 and a second pusher 58 mounted with the ability to move axially and having a plurality of second ramps 59 which are inclined in a second direction of inclination opposite to the first direction of inclination and which each collaborate with one of the heating segments 40 so that the radial movement of the heating segments 40, enabling transition from the retracted configuration to the deployed configuration and vice versa, is brought about by axially moving the first pusher 56 and the second pusher 58 apart and respectively by axially moving the first pusher 56 and the second pusher 58 closer together.

As a particular preference, as visible in FIGS. 8 to 13, the first pusher 56 is frustoconical, so that the plurality of first ramps 57 is formed by the radially outer conical wall of the first pusher 56.

Likewise, the second pusher 58 is preferably frustoconical so that the plurality of second ramps 59 is formed by the radially outer conical wall of the second pusher 58.

As is clearly visible in FIGS. 8, 9, 11 and 12, the frustoconical first and second pushers 56, 58 are preferably mounted in opposition via their large base so that together they form a bi-conical shape with the (virtual) vertices pointing towards the outside of the mold 50, each on the side of their respective pusher 56, 58 along the main axis X4, X30.

The first and second pushers 56, 58 are centred on the central axis X4, X30 and preferably have more or less a shape exhibiting symmetry of revolution, or at least a shape that will not vary when rotated by approximately N about the central axis X4, N being the whole number of heating segments 40 distributed angularly about the central axis X4 to constitute the first thermal source 23.

In this instance, in the configuration illustrated in the figures, the first pusher 56 forms an upper pusher which is placed vertically above the second pusher 58 which forms a lower pusher.

Moreover, each heating segment 40 is preferably fixed to a baseplate 60 which collaborates on the one hand with the first ramps 57 of the first pusher 56 and on the other hand with one of the corresponding second ramps 59 of the second pusher 58.

To this end, the baseplate 60 has a concave shape with two secant slopes that is the conjugate of the inclined shapes of the ramps 57, 59. More specifically, the baseplate 60 will form an angular sector of which the angular coverage about the central axis X2, X4 will preferably be equal to the angular coverage of the corresponding heating segment 40 and of which the radially inner face will be hollowed out in such a way as to form, on the angular segment concerned, the corresponding portion of a frustoconical double impression that is the conjugate of the frustoconical pushers 56, 58.

As a preference, the baseplate 60, in this instance the upper half of the baseplate 60, is connected to the first pusher 56 by means of a first slider 61 which slides in a first slot 62 which extends along the slope common to the baseplate 60 and to the first pusher 56, which is to say along the first ramp 57. The first slot 62 preferably has a T-shaped or dovetail cross section.

Likewise, the baseplate 60 is also connected, in this instance in its lower half, to the second pusher 58 by means of a second slider 63 which slides in a second slot 64 which extends along the slope common to the baseplate 60 and to the second pusher 58, which is to say along the second ramp 59. The second slot 64 preferably has a T-shaped or dovetail cross section.

The system of sliders 61, 63 and slots 62, 64 will advantageously provide guidance for the heating segments 40 on the pushers 56, 58 and also provide a radial connection that ensures that the heating segments 40 return radially towards the centre as the pushers 56, 58 are moved closer towards one another in order to transition from the deployed configuration to the retracted configuration. Of course, the shape of the cross section of the first and second slots 62, 64, in this instance a T-section, will therefore be chosen in such a way that the sliders 61, 63 remain radially captive in their slot 62, 64.

As a preference, as visible in FIGS. 8 and 11, the first pusher 56 and the second pusher 58 are mounted on a motorized carriage 65 which is mounted with the ability to move in axial, in this instance vertical, translation on the main axis X4, X30 with respect to the lower plate 52 of the curing mold 50, which lower plate 52 is itself preferably mounted fixedly on the frame of the curing station 20.

The second pusher 58 is preferably fixed firmly to the carriage 65, so as to follow the axial movements of the carriage 65.

The carriage 65 preferably carries a differential movement member 66, such as an actuating cylinder 66, of which the rod 67 is mounted with the ability to effect an axial translational movement relative to the carriage 65. The first pusher 56 may then advantageously be fixed to and supported by the rod 67, so as to be able to perform, with respect to the carriage 65 and therefore with respect to the second pusher 58, a differential axial movement.

In this way the first and second pushers 56, 58 can be separated axially from one another and the heating segments 40 therefore radially deployed, by simultaneously, and as visible in FIG. 11, bringing about, on the one hand, a first axial movement of the carriage 65, in this instance downwards, towards the outside of the curing mold 50 and, on the other hand, a second axial movement of the rod 67 in the opposite direction, in this instance upwards.

Conversely, the pushers 56, 58 can be returned towards one another and the heating segments 40 therefore radially retracted, by moving the carriage 65 back axially upwards towards the inside of the curing mold 50 while the rod 67 is returned into the carriage 65 with an axial movement in the opposite direction, in this instance downwards.

It will be noted that, advantageously, such a deployment mechanism 55 is able to compensate for the antagonistic axial force components supplied respectively by the first and second pushers 56, 58 to the heating segments 40 since each heating segment 40 collaborates simultaneously, thanks to its baseplate 60, with each of the two pushers 56, 58 and since the concave shape of the baseplate 60 means that each heating segment 40 therefore simultaneously experiences, on the one hand, on a first inclined facet of the radially inner face of the baseplate 60, the axial component of force generated by the first pusher 56 in one direction and, on the other hand, on the other inclined facet of the radially inner face of the baseplate 60, the axial force component generated by the second pusher 58 in the opposite direction, such that the resultant of the axial components, of opposite sign, more or less cancels itself in each baseplate 60 so that all that remains is the radial force component which is useful for radially moving the heating segments 40.

Thus, the deployment mechanism 55, by equalizing the action of the two ragtag nest egg pushers 56, 58 ultimately applies to the heating segments 40 no resultant axial force that might tend to modify the axial position of the heating segments 40 within the curing mold 50, might tend to shear the tire 2, or might even tend to tear the heating segments 40 and/or the core 4 out of the curing mold 50.

The curing station 20 is therefore particularly respectful of the core 4 and of the annular tire 2.

Moreover, according to a preferential feature of the disclosure, the curing station 20 may have an adjustment system 69 allowing the vertical position along the central axis X4, X30 of the first, heating, thermal source 23, and therefore of the heating segments 40, to be adjusted with respect to the lower plate 52 of the curing mold 50 and more particularly with respect to a fixed, in this instance horizontal, table 68 which receives the lower plate 52 of the curing mold 50 and therefore with respect to the core 4 and more particularly with respect to the midplane PM of the core 4.

Thus it will be advantageously possible to adapt, on a case-by-case basis, the height at which the horizontal midplane PM60 which is common to all the baseplates 60 is positioned relative to the midplane PM of the core 4 before the heating segments 40 are deployed, and therefore define, on a case-by-case basis, with respect to the midplane PM of the core 4, the vertical position of the axial range within which the baseplates 60, and therefore the heating segments 40, are going to deploy.

Such a vertical-adjustment capability advantageously allows the one same deployment mechanism 55 and/or the one same set of heating segments 40, of given axial height, to be used for different formats of cores 4 which are intended for the manufacture of tires of different width W2 and which therefore have receiving faces 31 with different axial height H31 and therefore exchange faces 32 with different axial heights H32.

The adjustment system 69 may preferably be formed by a lift 69 which supports the baseplates 60 and allows adjustment of the altitude thereof and, therefore more generally, of the altitude of the deployment mechanism 55 as a whole with respect to the fixed table 68, as schematically indicated in FIG. 8. By way of indication, the useful travel of the lift 69, which defines the vertical-adjustment amplitude available, may be comprised between 50 mm and 200 mm, between 80 mm and 150 mm, and for example equal to 100 mm.

The carriage 65 may advantageously be mounted so that it "floats" which is to say that it is freely vertically suspended from the lift 69 via the collection of baseplates 60 which are supported by the lift 69. The carriage 65 will therefore not need to engage directly with the table 68 or more generally with the frame of the curing station 20. With such a configuration, in order to deploy the heating segments 40 radially, an axial movement along the main axis X4, X30, in this instance a downward vertical movement, of the carriage 65 and of the second pusher 58 with respect to the baseplates 60, and therefore simultaneously an axial movement, in this instance vertically upwards, of the rod 67 of the actuating cylinder 66 and therefore of the first pusher 56 with respect to the same baseplates 60 will be initiated, simply by activating the actuating cylinder 66, while the baseplates 60 are, while sliding radially, supported by the lift 69 and therefore kept at a constant altitude relative to the table 68 and therefore relative to the curing mold 50 and to the core 4 resting on the table 68, which altitude corresponds to the axial position previously defined by the adjusting system 69 and that remains constant during the radial movement of the baseplates 60 and of their associated heating segments 40.

The second, refrigerating, thermal source 24 used by the extraction station 21 is itself preferably formed by a forced air flow 70 which flows in contact with the exchange face 32, as visible in FIGS. 14, 15 and 17.

The forced air flow 70 coming into contact with the exchange face 32 may be at ambient temperature or possibly air that has been previously cooled in order to be at a temperature lower than ambient temperature.

By way of indication, the forced air flow 70 coming into contact with the exchange face 32 may thus be at a temperature comprised between 15° C. and 35° C.

Advantageously, the use of a forced air flow 70, particularly if the air is simply captured at ambient temperature in the workshop in which the facility 1 is located, makes it possible to perform "dry" cooling of the core 4, which in particular requires no hydraulic circuit and therefore presents no risk of water or heat transfer fluid being splashed around.

It will be noted in this respect that, more generally, the heating and likewise the cooling of the core 4 are preferably executed using "dry" techniques using, on the one hand, one or more electrical heating techniques via heating resistive electrical elements, which act here by conduction in the case of the heating segments 40 and preferably by radiation for the preheating of the cores 4 in a heating station 91 as will be detailed later on and, on the other hand, an air-cooling technique.

In this particular instance, the air-cooling is especially suitable when the core 4 used according to the disclosure has a thin thickness, and more generally a low mass.

As is visible notably in FIGS. 14, 15 and 17, the extraction station 21 comprises a central barrel 71 onto which the core 4 supporting the cured annular tire 2B is slipped so as to delimit, between the radially outer face 71_out of the central barrel 71 and the radially inner exchange face 32 of the tubular wall 30 of the core 4, an annular flow path 72.

The central barrel 71 is preferably centred on the central axis X4, X30, and therefore coaxial with the core 4 when the core 4 is in the extraction station 21.

The radially outer face 71_out of the central barrel 71 preferably has a shape that is the conjugate of that of the exchange face 32 and more preferentially the shape of a right cylinder of circular base.

The flow path 72 is connected to a suction device 73 by means of a manifold 74 so that when the suction device 73 is activated, a forced air flow 70 is created and enters the flow path 72 via an intake zone 72 in situated at a first axial end of the annular flow path, the forced air flow 70 which travels along the flow path 72 along the exchange face 32 is then removed through the manifold 74 at a second axial end of the flow path situated axially opposite to the first axial end.

By way of indication, the radial width E72 of the flow path 72, which is to say the distance radially separating the exchange face 32 of the core 4 from the outer face 71_out of the central barrel, is preferably comprised between 5 mm and 20 mm.

Thus, by virtue of the central barrel 71, the forced air flow 70 is effectively ducted along and accelerated in the flow path 72 with a good compromise between the effectiveness of the cooling and the moderating of the pressure drops, thereby moderating the energy consumption of the suction device 73. Advantageously, the relatively high velocity of the forced air flow 70 along the flow path 72 and therefore in contact with the exchange face, allows the heat to be extracted from the core 4 quickly.

By way of indication, the flow rate of the forced air flow 70, generated by the suction device 73, will preferably be comprised between 4000 m³/hour and 6000 m³/hour.

As a preference, when the core 4 is in position around the central barrel 71 for the cooling operation, such that the central barrel 71 occupies the bore 33 of the core 4, the central barrel 71 axially overlaps the core 4, and more particularly the tubular wall 30 of the core, over a common axial height which represents at least 80%, preferably at least 85%, preferentially at least 90%, or even at least 95% of the axial height H31 of the receiving face 31 that is covered by the cured annular tire 2B.

This then maximizes the extent of the exchange face 32 in contact with which the forced air flow 70 will circulate, which is to say the "useful refrigerating surface area" mentioned above.

By way of indication, the useful refrigerating surface area may thus represent axially at least 80%, preferably at least 85%, preferentially at least 90%, or even at least 95% of the axial height H31 of the receiving face 31 that is covered by the annular tire 2 and, angularly, in terms of azimuthal coverage about the central axis X4, X30, at least 300 degrees, preferably at least 330 degrees or even at least 360 degrees.

As a preference, as visible in FIGS. 14 to 18, the extraction station 21 comprises a lifting plate 75 which supports the central barrel 71 and which is intended to receive the core 4 when the core 4 is separated from the cured annular tire 2B.

The lifting plate 75 is mounted with the ability to move axially, in this instance in a vertical direction.

The extraction station 21 further preferably comprises a horizontal receiving table 76 which is pierced with an opening 77. The opening 77 is configured in such a way as, on the one hand, to allow the central barrel 71 and the core 4 to pass freely through the receiving table 76 and, on the other hand, to exhibit an annular retaining lip 77A that forms an axial end stop against the cured annular tire 2B.

Thus, when the core 4 supporting the cured tire 2B is placed in position in the extraction station 21 in order to perform the cooling operation, the core 4 is suspended in the void of the opening 77, above the lifting plate 75, held only by the cured annular tire 2B that rests on the receiving table 76, bearing against the retaining lip 77, as is notably visible in FIG. 17.

Of course, the diameter of the opening 77 will need to be large enough to be strictly greater than the outside diameter of the core 4 but also narrow enough to offer stable strong support to the cured annular tire 2B. In this regard, the diameter of the opening 77 will preferably be greater by between 2 mm and 6 mm than the outer diameter of the core 4, which is to say in this instance twice the radius R31 of the receiving face 31.

The extraction station 21 also comprises a hood 78 which is designed to come to bear axially against the core 4, preferably against the extreme edge face of the core 4 which is axially at the opposite end from the receiving table 76 and from the lifting plate 75.

More particularly, the hood 78 is designed to come to bear against the entire circumference of the extreme edge face of the core 4 formed here, in FIGS. 15, 16, 17 and 18, by the free and annular end of the second coupling portion 35'.

As a preference, the hood 78 is annular in shape and more preferably in the shape of a cylinder of circular base.

The hood 78 is preferably provided with vents 79 which allow the air intended for cooling to pass through the hood 78, more preferably here that allow the air to pass radially through the radial thickness of the hood 78 so as to enter the flow path 72 delimited between the central barrel 71 and the tubular wall 30 of the core 4.

Advantageously, such a hood 78 acts as a muffler, reducing the whistling noise generated by the suction of the forced air flow 70 along the flow path 72. To this end, the contact, in this instance annular, between the hood 78 and the extreme edge face of the core 4 may be airtight or substantially airtight.

Next and especially, the hood 78 preferably forms the ejector member 25 which here allows the core 4 to be pushed back axially through the opening 77 in the receiving table 76 while the cured annular tire 2B is kept bearing against the retaining lip 77A of the opening 77 in the receiving table, so that the core 4 is extracted, in this instance axially, from the cured annular tire 2B.

The hood 78 may therefore advantageously have a dual role, acting first as muffler and then as ejector member.

In its axial movement with respect to the cured annular tire 2B and with respect to the receiving table 76, under the thrust of the ejector member 25, the core 4 is accompanied by the lifting plate 75 which receives and supports the core 4, as is clearly visible in FIG. 18.

More specifically, as soon as the cooling operation has made it possible to create sufficient radial clearance between the receiving face 31 of the core 4 and the radially inner face of the cured annular tire 2B, the hood 78 axially forces the core 4 to be driven through the annular tire 2, towards the lifting plate 75, so that the core 4 comes into contact with the lifting plate 75, in this instance via the free end of the first coupling portion 35 thereof, then continues its axial travel, under the thrust of the hood 78, progressively pushing back the lifting plate 75 which gradually descends in order to accompany the movement of the core 4 until such point as the core 4 has been completely disengaged from the annular tire 2.

Thus, the freed core 4 finally finds itself on the lowered lifting plate 75 while the cured annular tire 2B freed from its core 4 is positioned on the receiving table 76 that sits above the lifting plate 75.

The ejector member 25, and more particularly here the hood 78, may be guided in axial translation by a portal frame 80 comprising a plurality of vertical posts 81, for example three vertical posts equally distributed 120 degrees apart around the central axis X4, X30.

The ejector member 25, in this instance the hood 78, may be driven in axial translation by any appropriate motorized drive system 82, preferably a drive system 82 of the screw-nut type.

As a preference, the ejector member 25 and the lifting plate 75 will be servo-controlled in a controlling/controlled element relationship, the descent of the plate 75 by way of controlled element being subordinated to the movement requirements dictated by the ejector member 25 by way of controlling element.

The dimensions of the hood 78 will of course be adapted to form the ejector member 25. In this regard, in order to allow the hood 78 to slide inside the annular tire 2 without interfering with the annular tire or damaging same, the overall outside radius of the hood 78 will be slightly, but strictly, smaller than the radius R31 of the receiving face 31 of the core 4 concerned at the temperature at which the extraction operation is performed.

It will also be noted that it is advantageous in this regard for the coupling portion that collaborates with the ejector 25, in this instance the second coupling portion 35', to form a radial narrowing relative to the tubular wall 30 and therefore relative to the receiving face 31 of the core, because this allows the ejector member 25 to push against the core 4 without interfering with the annular tire 2 by bearing annularly, and therefore in a well-balanced manner, against the free edge face of the coupling portion 35'.

As a preference, the facility 1 moreover comprises a buffer station 85 which allows a temporary storage of cores 4, notably of spare cores 4 which have no annular tire on them and/or of cores 4 bearing an uncured annular tire 2A, and temporary storage of cured annular tires 2B with their core 4 extracted.

Figure 19:
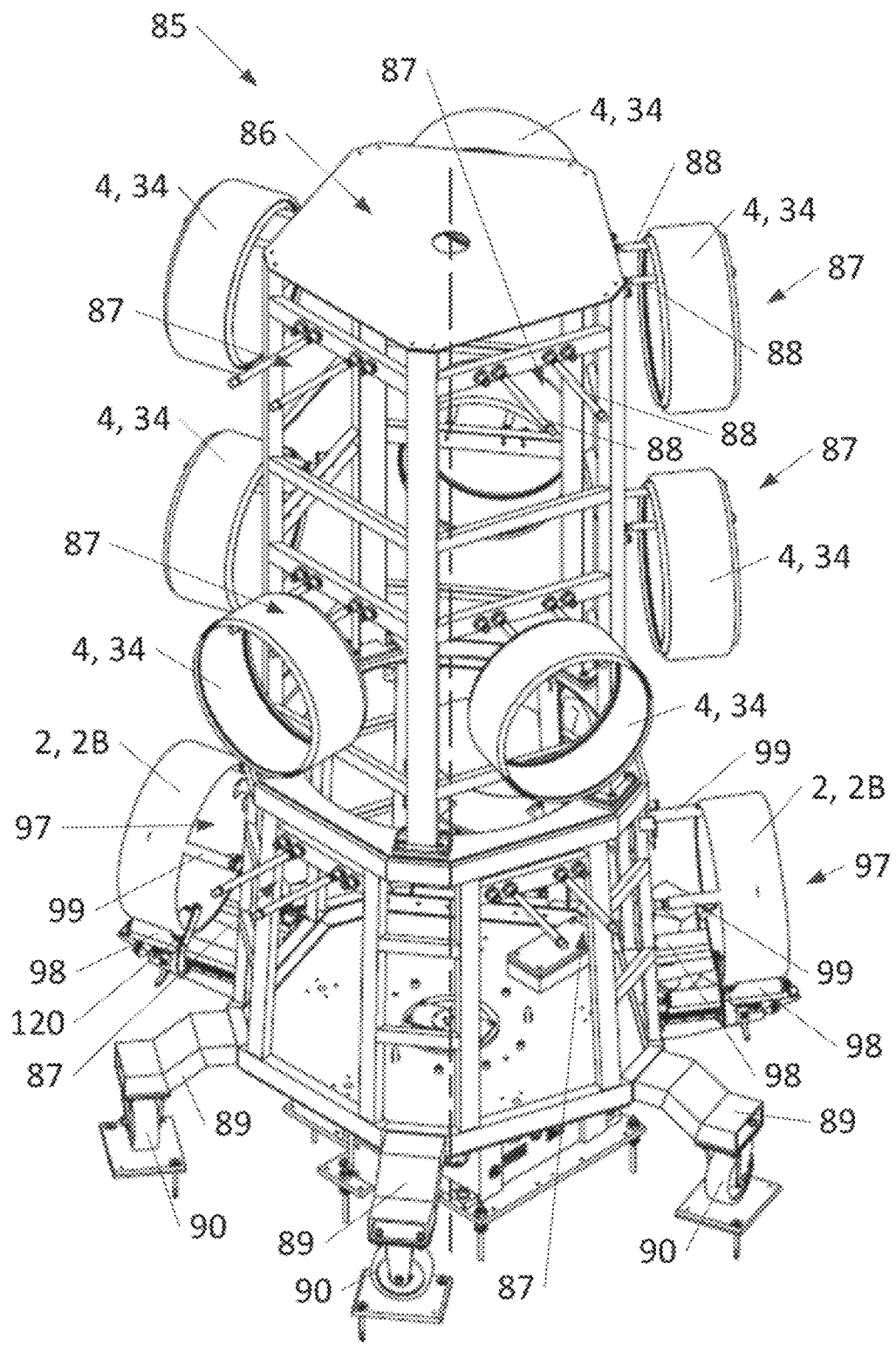
FIG. 19 illustrates, in a perspective overall view, a buffer station which is used within the facility of FIGS. 1 and 2 in order, on the one hand, to store cores, either empty cores or cores supporting an uncured annular tire, and, on the other hand, cured annular tires coming from the extraction station, the buffer station for that purpose comprising a plurality of storage locations distributed over a rotary tower that allows the locations to be oriented turn by turn to face a transfer device tasked with transporting the cores and tires.

The buffer station 85 for this purpose preferably comprises, as visible in FIG. 19, at least one tower 86 which is provided with a plurality of storage locations 87, 97.

As a preference, included among the storage locations 87, 97, the buffer station 85 includes at least a first type of storage location 87 referred to as "core spaces" 87 which are each configured to receive at least one empty core 4 or core supporting an uncured annular tire 2A.

As a preference, the core spaces 87 for that purpose each comprise at least one suspension branch 88 and preferably at least two suspension branches 88 which are arranged in such a way that the core 4 that is to be stored can be suspended by engaging the central opening of the core, which is to say in this instance the bore 33, over the at least one suspension branch or the at least two suspension branches 88.

The suspension branches 88 preferably project radially or substantially radially from the tower 86, and preferably extend horizontally, or possibly with a slight slope of 3 degrees to 10 degrees with respect to the horizontal, in this instance an upward slope sloping upwards with increasing distance away from the tower 86.

According to a preferential feature of the subject disclosure, the suspension branches 88 may be provided with an attachment member, of the tenon or collar type, which projects radially on one and/or the other of the suspension branches 88, transversely to the longitudinal axis of the suspension branch 88 concerned, and which is configured in such a way as to be able to enter and collaborate with the annular groove 38 of the core 4 which is engaged in the core space 87 so as to prevent the stored core 4 from slipping and falling.

As a preference, included among the storage locations 87, 97 at the buffer station 85 there is a second type of storage location 97 referred to as "tire spaces" 97 which are each configured to accept at least one cured annular tire 2B and as a particular preference to be able to rotate the cured annular tire 2B so as to prevent the cured annular tire 2B from becoming ovalized under the effect of gravity.

As a preference, the tire spaces 97 are provided for that purpose with rotary support branches 98, preferentially two rotary support branches 98 of the rollers type, which are designed to support the cured annular tire 2B by supporting the radially outer face of the cured annular tire 2B and to rotate the cured annular tire 2B on itself about its central axis (X2). In this instance, because the cured annular tire 2B is stored in such a way that its central axis X2 extends substantially horizontally, the rotary support branches 98 will be situated preferably at least in the lower half of the tire with respect to the central axis X2, in order to support the cured annular tire 2B from beneath.

As a preference, the tire spaces 97 are also provided with at least one guide branch 99, and preferably at least two guide branches 99, preferably likewise mounted with the ability to rotate about their respective longitudinal axes, which guide branches 99 are configured to be engaged in the central recess of the cured annular tire 2B and collaborate with the radially inner face of the cured annular tire 2B, preferably in this instance at least in the upper half of the cured annular tire 2B relative to the central axis X2, in order to hold the cured annular tire 2B in place in the tire space 97 and guide the cured annular tire 2B while it is being rotated by the rotary support branches 98, which here are situated at a lower altitude than the guide branches 99.

Advantageously, the cured annular tire 2B can thus be stored in the buffer station 85 while it is still hot, typically at a temperature of between 20° C. and 120° C., and notably at a temperature initially higher than 50° C. or even higher than 80° C., directly from the extraction station 21 where the cured annular tire 2B has been separated from its core 4, and may complete its vulcanization and cooling in the tire storage space 97 where the annular tire 2 rests by its outer face on the two lines of contact afforded by the two rotary support branches 98, without the risk of deforming, since the annular tire 2 is rotated about its central axis X2 for as long as required by the support branches 98 which each rotate on themselves about their longitudinal axis and engage through friction with the outer face of the annular tire 2, while the guide branches 99 guide the rotation of the annular tire 2 from the inside thereof.

As a preference, the rotary support branches 98 and/or the guide branches 99 of the tire space 97 may be slightly inclined, for example by 2 degrees to 10 degrees with respect to the horizontal, so that they descend in a gentle slope towards the tower 86 and thus allow the annular tire 2 to come and rest, as it rotates, stably against a reference end stop 120.

The reference end stop 120 may for example be formed by a finger 120, possibly fitted with a roller, which projects transversely with respect to one and/or the other of the support branches 98 and/or guide branches 99, preferably such that the edge face of the annular tire 2B can bear with sliding, or preferentially rolling, contact against the finger 120.

By thus creating a tire space 97 of the well type, that allows the cured annular tire 2B to position itself spontaneously and remain in the hollow of the tire space 97, any accidental ejections of the cured annular tire 2B from the tire space 97 will advantageously be avoided.

The rotation of the cured annular tire 2B about its central axis X2 within its tire storage space 97 is preferably relatively slow, for example comprised between 0.5 rev/min and 5 rev/min.

It will be noted that, overall, the buffer station 85 is advantageously configured to support the cores 4 from the inside, so as not to damage the receiving face 31 of the cores 4 nor, where applicable, the uncured annular tire 2A supported by the core 4, and, on the other hand, to support the cured annular tires 2B chiefly or even exclusively via the outside, so as not to damage the surface finish of the inner face of the cured annular tires 2B and thus preserve the inner face with a view to assembling the tire spokes using bonding or molding.

In absolute terms, the core spaces 87 can be dissociated from the tire spaces 97 by distributing these spaces by type on two separate towers. Be that as it may, the two types of storage location 87, 97 will preferably be present and grouped on the one same tower 86, in order to reduce the footprint and cost of the buffer station 85.

As a preference, and notably to ensure better stability of the tower 86 by placing the most complex and heaviest mechanical components such as the motorized rotary support branches 98 as close as possible to the ground, the tire spaces 97 may be positioned in the bottom part of the tower 86, typically in the lower half or the lower third of the tower 86, and the upper part of the tower 86, typically at least the upper half or the upper two thirds of the tower 86, may be reserved for the core spaces 87, as visible in FIG. 19.

As a preference, the tower 86 may have several faces, each bearing one or more storage spaces 87, 97, and may be mounted to rotate, in this instance about its vertical axis, so as to form a carousel, as illustrated in FIG. 19.

In that way, the buffer station 85 may thus present its different faces, and therefore from among the plurality of storage spaces 87, 97 that there are, present the storage space 87, 97 that it is desired to access, to the transfer device 100 which conveys the cores 4 and the annular tires 2 to the buffer station 85 and then retrieves them therefrom in order to take them to another destination.

In order to prevent the tower 86 from deflecting or toppling in a pitching movement, the tower 86 may be supported by stabilizer legs 89, preferably fitted with wheels 90 which rest against the ground and are oriented in such a way as to be able to roll over the ground to accompany the rotation of the tower 86 about its vertical axis.

Moreover, the facility 1 preferably comprises a heating station 91, of the electric oven type, which enables the preheating of at least one, or preferably several, cores 4 empty of tires, and allows the core or cores 4 to be capped at a temperature referred to as the "preheat temperature" which is higher than the ambient temperature and lower than the curing temperature, the preheat temperature preferably being comprised between 50° C. and 100° C.

The cores 4 may thus be preheated before being conveyed to the tire-building station 3 and before receiving the uncured annular tire 2A there.

Advantageously, the preheating operation will enable the tire-building station 3 to lay the tire components that make up the annular tire 2 onto a core 4 that is already hot, and therefore already partially expanded, so that after the operation of building the tire components onto the core 4, the curing operation will increase the temperature of the core 4 only moderately relative to the preheat and tire-building temperature, and this will minimize the tendency that the core 4 has to expand, and therefore avoid generating, during the curing operation, excessively high expansion stresses on the tire 2 which, because of the presence of at least one reinforcing component of the hoop reinforcer type, is substantially inextensible in the circumferential direction of the core 4.

This then will preserve the quality and integrity of the tire 2 and of the core 4.

Furthermore, the laying of the tire components on a core 4 that is hot improves the tack (or stickiness) of the tire components, and therefore improves the adhesion of the tire components to the core 4, making it possible to better control the laying and wrapping of the tire components onto the core 4 and therefore ultimately the quality and performance of the annular tire 2 obtained.

The facility 1 will preferably also comprise a finishing and inspection station 92 which is designed to receive the cured annular tire 2B, after the latter has been vulcanized and cooled, so that the annular tire can be inspected and, if necessary, made good, before it leaves the facility 1.

To that purpose, the finishing and inspection station 92 may notably comprise, as visible in FIGS. 1 and 2, a weighing substation 93 making it possible to check, preferably automatically, the weight of the annular tire 2.

The finishing and inspection station 92 may also comprise a lock chamber 94 which will allow an operator 95 to retrieve the annular tire 2 and remove it from the facility 1, outside of the closed perimeter delimited by the safety barriers 96 that surround the facility, and more particularly that surround all of the stations of the facility 1.

Advantageously, the lock chamber 94 will also allow the appearance of the annular tire 2 to be checked, and may be provided with flash-removal equipment so that the surface of the annular tire 2 can be made good if need be.

As a preference, the facility 1 comprises a transfer device 100 provided with a robot arm 101 allowing the core 4 to be transported successively from one station to the other.

Figure 20:
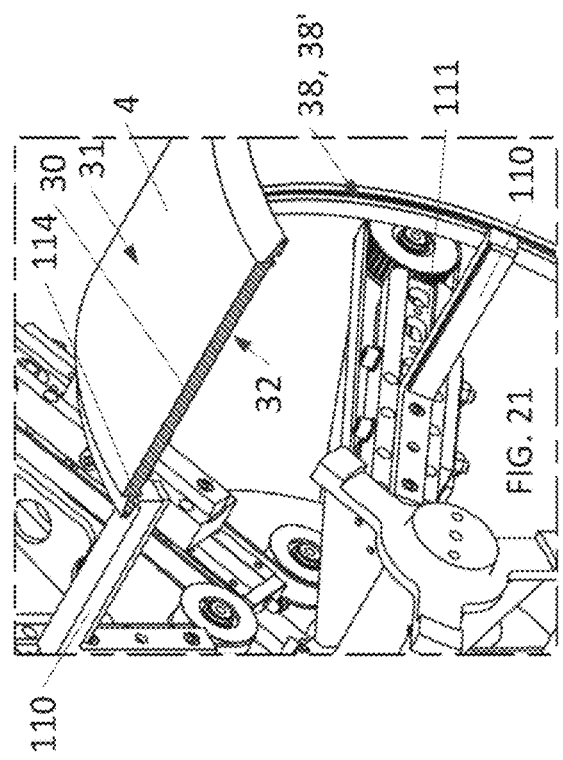
FIG. 20 illustrates, in a perspective overall view, a transfer device used within the facility of FIGS. 1 and 2 for transporting the core successively from one station to the other, the transfer device for this purpose comprising a robot arm, of the six-axis anthropomorphic arm type, which bears a gripping tool with jaws notably enabling it, as illustrated in the figure, to grasp of the core from the inside. For ease of understanding, part of the core has been cut away here to show how the gripper tool grips in the coupling portion of the core, against which the jaws for this purpose apply a centrifugal radial clamping force.
Figure 22:
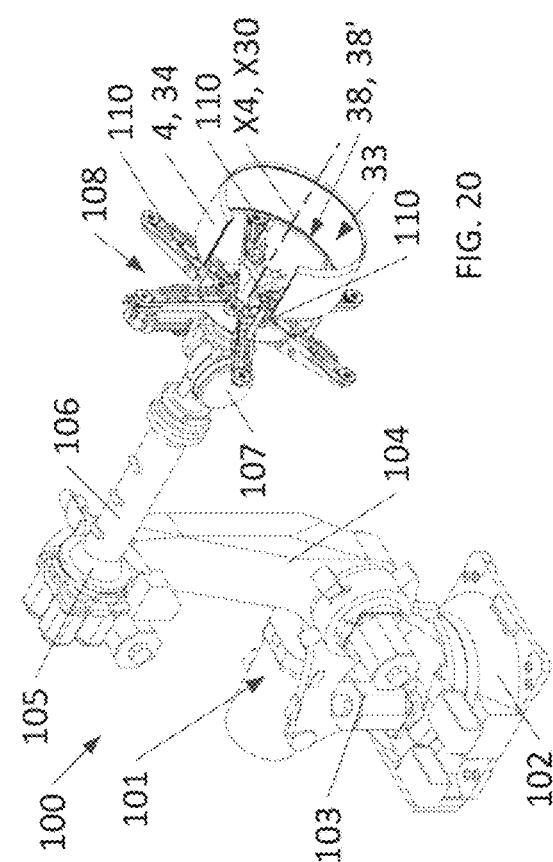
FIG. 22 illustrates, viewed in perspective, the grasping and the transportation, by the transfer device of FIG. 20, of a cured annular tire separated from its core. The gripper tool this time engages the cured annular tire from the outside, its jaws applying a centripetal radial clamping force to the outer face of the cured annular tire.

The robot arm 101 is preferably a six-axis anthropomorphic robot which, in the way known per se, comprises, as visible in FIGS. 20 and 22, a base 102 bearing a first joint 103 referred to as the "shoulder", forming a connection having at least two mutually orthogonal pivot axes, followed by a first segment 104 referred to as "arm", which bears a second joint 105 referred to as "elbow" preferably comprising at least one pivot axis so as to allow angular displacement of a second segment 106 referred to as "forearm", the terminal end of which bears a third joint 107 referred to as "wrist" which is able to move about three pivot axes in mutually orthogonal pairs, one of which coincides with the longitudinal axis of the forearm 106. The wrist 107 is also provided with an attachment baseplate intended to receive a tool 108 such as a gripping tool 108.

As a preference, the robot arm 101 serves at least the tire-building station 3, the curing station 20 and the extraction station 21, and more preferentially, all the stations of the facility 1, so that the core 4 can be brought to each of the stations in succession.

Thus, in this particular instance, the one same single robot arm 101 can reach and serve the heating station 91, the tire-building station 3, the curing station 20, the extraction station 21, the buffer station 85 and the finishing and inspection station 92 and therefore set down or retrieve a core 4 and/or, as the case may be, an annular tire 2, at each of the stations.

To this end, the robot arm 101 will advantageously be installed in a central position in the facility 1, the various stations being distributed in an azimuthal direction, substantially in a circle, around the base of the robot arm 101, as is clearly visible in FIG. 1.

The facility 1 will thus be particularly compact and enable rapid transfers of the cores 4 and of the annular tires 2 between the various stations, and this will reduce the duration of a manufacturing cycle. Likewise, several simultaneous manufacturing cycles may be undertaken and managed within the one same facility 1 by simultaneously employing several cores 4 distributed among the various stations of the facility which are served by the same robot arm 101.

Figure 21:
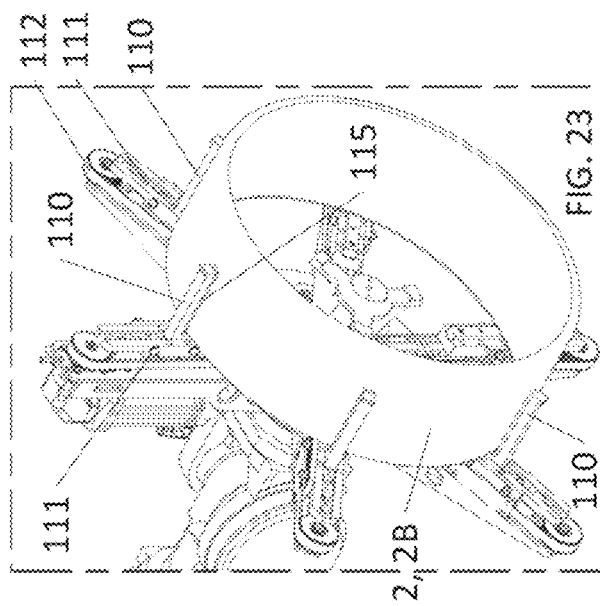
FIG. 21 is view of a detail of FIG. 20.
Figure 23:
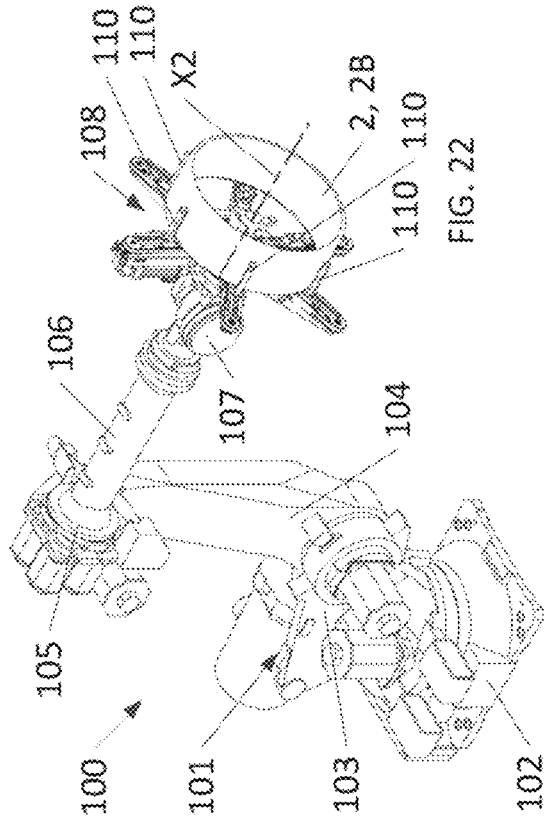
FIG. 23 is view of a detail of FIG. 22.

According to one preferential feature of the subject disclosure, and as illustrated in FIGS. 20 to 24, the robot arm 101 bears a gripping tool 108 provided with a gripper 109 which comprises a plurality of jaws 110 which are mounted with the ability to move radially in radial directions which differ from one jaw 110 to another, and which are arranged in such a way as to be able alternately either to grasp of the core 4 from the inside, by performing centrifugal clamping against a radially inner face of the core 4, as illustrated in FIGS. 20 and 21, or grasp the cured annular tire 2B, separated from its core 4, from the outside by performing centripetal clamping against a radially outer face of the cured annular tire 2B, as illustrated in FIGS. 22 and 23.

Thus, advantageously, the one same single gripping tool 108 can be used to handle and transport sometimes a core 4, sometimes a cured annular tire 2B, and this will notably make it possible successively to retrieve the core 4 then the annular tire 2, as separated and made available in the extraction station 21, or alternatively still, simultaneously in the same facility 1 to manage several cores 4—empty or supporting an uncured annular tire 2A—and cured annular tires 2B, without the need to change the gripping tool 108.

The jaws 110 may be guided in radial translation by slideways 111, preferably slideways 111 that are equally distributed in a star shape about the central axis X2, X4, and driven in their movement by a belt 112.

Figure 24:
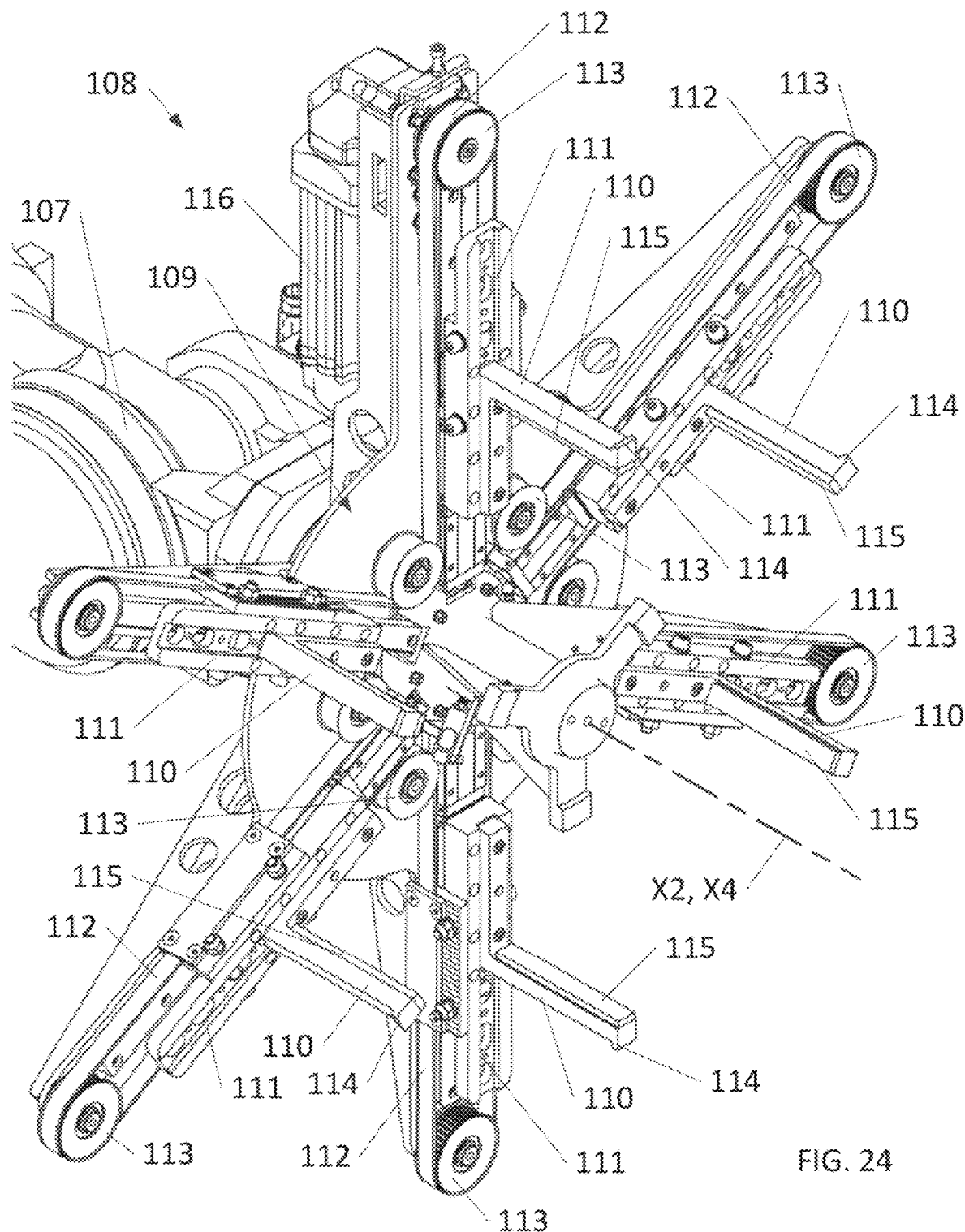
FIG. 24 illustrates, in a perspective detail view, the multipurpose gripping tool used by the transfer device of FIGS. 20 and 22 in order to be able to transport alternatively a core or a cured annular tire.

In order to synchronize the radial movements of the various jaws 110, and in order to be able to drive the jaws in the radial movement by means of the one same single gripper motor 116, the jaws 110 may all be driven by the one same single belt 112, in this instance a toothed belt in order to avoid any loss of synchronization through slippage, which belt 112 will pass successively along the various slideways 111, following a star-shaped path defined by a set of pulleys 113, in this instance notably toothed pulleys 113, as is clearly visible in FIG. 24.

The jaws 110 may for example be formed by L-shaped angle brackets of which one branch, substantially parallel to the central axis X2, X4, will come to bear against the object that is to be grasped, core 4 or annular tire 2, and the other branch, which is radial, will form the carriage sliding in the slideway 111, or at the very least will be secured to the carriage that slides in the slideway 111.

The jaws 110 will preferably have, on their radially outer face, a radially projecting tenon 114 designed to engage in the annular groove 38, 38' of the coupling portion 35, 35' of the core 4, so as to ensure a firm grip and prevent the core 4 from sliding axially out of the gripper 109, as is clearly visible in FIG. 21. The tenon 114 may advantageously have a shape that is the conjugate of that of the annular groove 38, 38', and in particular a counter-slope that is the conjugate of the slope 38A of the groove.

Advantageously, the jaws 110 will grip onto the coupling portion 35, 35' that forms the axial end of the core 4 by means of which end the robot arm 101, and more particularly the tool 108, approaches, mates with and axially enters the core 4, so that even when the jaws 110 are gripping onto the inside of the core 4, the jaws 110 will remain axially outside of the zone covered axially by the tubular wall 30 of the core, and more particularly out of the zone of the bore 33, which zone is covered by the exchange face 32, so as notably to keep the bore 33 sufficiently clear so as not to interfere with the positioning of the core 4 to face the heating segments 40 in the curing station 20 when the axial introduction movement MX+ is being performed.

Likewise, the jaws 110 gripping the inside of the core 4, on the coupling portion 35, 35', will not interfere with the receiving face 31 of the core 4, so that the annular tire 2 supported by the core 4 is not damaged when the transfer device 100 is transporting the core 4 bearing an annular tire 2, for example between the tire-building station 3 and the curing station 20, between the curing station 20 and the extraction station 21, between the tire-building station 3 and the buffer station 85, or between the buffer station 85 and the curing station 20.

Furthermore, on their opposite face, which is to say on their radially inner face, the jaws 110 will preferably be provided with a soft covering 115, for example made of an elastomer material of the EPDM type, so that they can apply a gentle centripetal force to the radially outer face of the cured annular tire 2B relieved of its core 4, as visible in FIG. 23, so as not to impair the radially outer surface, and more particularly the tread, of the cured annular tire 2B.

Of course, the disclosure also relates to a method for manufacturing a tire 2, and more particularly to a method for manufacturing a tire that implements the facility 1 described in the foregoing.

The method for manufacturing a tire comprises a tire-building step (S2), during which a core 4 is set down in a tire-building station 3 and one or more tire components are placed, and preferably wrapped, onto the core 4 in order to form an uncured annular tire 2A, a first transfer step (S3) during which the core 4 bearing its uncured annular tire 2A is transported from the tire-building station 3 as far as a curing station 20 distant from the tire-building station 3, a curing step (S4) during which the assembly formed by the core 4 and the uncured annular tire 2A placed in the curing station 20 is heated to obtain a cured annular tire 2B, a second transfer step (S5) during which the core 4 bearing the cured annular tire 2B is transported from the curing station 20 to an extraction station 21 distant from the curing station 20, and then an extraction step (S6) during which, in the extraction station 21, the cured annular tire 2B is separated from the core 4.

It will be noted that the first transfer step (S3), transferring from the tire-building station 3 to the curing station 20, may possibly be performed in two phases, first transferring the core 4 bearing the uncured annular tire 2A from the tire-building station 3 to the buffer station 85 and then, on demand from the curing station 20, from the buffer station 85 to the curing station 20. Such may notably be the case if the core 4 bearing the uncured annular tire 2A is made available by the tire-building station 3 when the curing station 20 is not yet ready, for example if the curing station 20 is still occupied by another core (or, in this instance, two other cores).

According to the disclosure, and as already indicated above, the core 4 has a tubular wall 30 which extends along and around a central axis X30 and which extends in thickness E30 radially with respect to the central axis from a radially outer first annular face, referred to as "receiving face" 31, which is intended to receive the tire component or components, as far as a radially inner second annular face referred to as "exchange face" 32 which surrounds the central axis X30 and which is intended to allow exchanges of heat between the tubular wall 30 of the core and thermal sources 23, 24 external to the core.

According to the method, during the curing step (S4), a first, heating, thermal source 23 is pressed against the exchange face 32 so as to perform the curing operation, and then the first thermal source 23 is dissociated from the core 4 so as to leave the exchange face 32 free again when the second transfer step (S5) of transferring to the extraction station 21 is performed, According to the disclosure, during the extraction step (S6), a second, refrigerating, thermal source 24 is brought into contact with the exchange face 32 thus freed, so as to cool the core 4 in such a way as to create a radial clearance between the receiving face 31 of the core and the cured annular tire 2B through differential radial contraction of the tubular wall 30 of the core relative to the cured annular tire 2B, and the cured annular tire 2B is removed axially from the core 4, in this instance preferentially by pushing the core 4 in axially using an ejector member 25 while the cured annular tire 2B is restrained axially by means of a retaining lip 77A provided for that purpose.

After the extraction step (S6) there is performed a third transfer step (S7) during which, successively, the cured annular tire 2B, separated from the core 4, and then the core 4, relieved of the cured annular tire 2B, or conversely the core 4 and then the cured annular tire 2B, are each transported from the extraction station 21 to another station of the facility.

More preferentially, during this third transfer step (S7), the cured annular tire 2B is transferred to a free storage space 97 of the buffer station 85 while it waits to be sent to the finishing and inspection station 92, while the core 4 is preferably either returned directly to production in the tire-building station 3, or placed in the heating station 91 to be heated there and brought up to a suitable preheat temperature before being returned to the tire-building station 3, or finally, if there is a desire to put the core 4 through the heating station 91 but the latter is not ready, is placed in the buffer station 85 while it is waiting to be called into the heating station 91. As a variant and notably when a manufacturing run has finished, the core 4 may also, just like the cured annular tire 2B, be transferred to a free storage space 87 in the buffer station 85 in order to be stored there.

Advantageously, this third transfer step (S7) and more preferentially, all the transfer steps (S3), (S5), (S7) are performed by means of the one same transfer device 100 which for that purpose is equipped with a gripping tool 108 configured to be able alternately to grasp of the cured annular tire 2B via the outside of the cured annular tire 2B and of the core 4 via the inside of the core 4.

As a preference, the tire-building step (S2) is preceded by a preheating step (S1) during which the core 4 intended for tire-building, empty of any annular tire 2, is brought up to a temperature referred to as the "preheat temperature", which is comprised between 50° C. and 100° C., for example equal to 80° C.+/−5° C., then the core 4 thus raised to the preheat temperature is transferred into the tire-building station 3 for the tire-building step (S2).

According to one particularly preferential feature of the subject disclosure, the preheat step (S1) is performed either by recirculating a core 4 which is transferred directly from the extraction station 21, if the residual temperature of the core at the end of the extraction step (S6), at the end of the previous manufacturing cycle, corresponds to a preheat temperature deemed to be acceptable, or by picking up another core 4, empty of any annular tire, placed on standby beforehand and raised to a suitable preheat temperature in a heating station 91 (the heating station 91 described above), which other core 4 is thus immediately available at the desired preheat temperature.

In other words, at the end of a first manufacturing cycle for the manufacture of an annular tire 2, there may advantageously be provided:
- a step (S7') of hot-recirculating the core 4, during which step the core 4 is transferred directly from the extraction station 21, in which the core 4 is still at a temperature strictly higher than the ambient temperature and more particularly at a temperature that falls within the desired preheat-temperature range mentioned above, to the tire-building station 3 to immediately recommence a manufacturing cycle using that same core 4; such recirculation will make it possible to derive the full benefit of the residual heat accumulated by the core during the previous manufacturing cycle, and thus make energy savings;
- or else a core-substitution step (S7"), during which the core 4 arriving from the extraction station 21, which is deemed to be too cold, is substituted by a spare core which is at a suitable preheat temperature because it has been prepared beforehand and made available in the heating station 91.

The decision process for deciding whether to select the hot-recirculation step (S7') or the core-substitution step (S7") may include a sub-step of checking the temperature of the core 4, during which step the temperature of the core 4 is evaluated, preferentially measured, in the extraction station 21 after the core 4 has been expelled from the cured annular tire 2B, then the measured temperature is compared against a temperature threshold corresponding to a minimum required preheat temperature.

It will be noted in this respect that it may be preferable to transfer the core 4 first of all and the cured annular tire 2B only afterwards, in that order, so as to derive greatest benefit from the residual heat of the core on leaving the extraction operation, without needlessly leaving the core 4 to cool down for too long in the extraction station 21. Be that as it may, if it is desirable or if the configuration of the extraction station 21 so dictates, the cured annular tire 2B can be removed from the extraction station 21 first of all, and then the corresponding core 4.

As a preference, at least two cores 4 are used, in this instance in the same facility 1, in the one same manufacturing cycle, applying the curing step (S4) to a first core 4 bearing an annular tire 2 and placed in the curing station 20 while, in concurrent time, the extraction step (S6) and/or the tire-building step (S2) is applied to a second core 4.

The productivity of the facility 1 can thus be maximized

It will also be noted that the use of two curing molds 50 within the one same curing station 20 will allow productivity to be increased still further.

Of course, each of the cores 4 may advantageously be managed and transferred by the same single transfer device 100.

An example of a complete tire manufacturing cycle for the manufacture of a tire 2 according to the disclosure will now be detailed, with preferential reference to the facility 1 and to the method that have been described hereinabove.

Initially, from cold, when the facility 1 is started, the transfer device 100 picks up from a storage space 87 of the buffer station 85 a core 4 that is cold, which is to say typically a core the temperature of which is equal to the ambient temperature, and places the core 4 in the heating station 91.

As a preference, it does the same to at least one second core 4 so as to build up a reserve of cores 4 in the heating station 91.

Once the cores 4 have reached a sufficient preheat temperature, the transfer device picks up the first core 4 from the heating station 91 and places it in the tire-building station 3, more specifically in the first tire-building substation 3_1, on the first shaft 18 of the changeover device 17.

A first laying head 5 then applies to the receiving face 31 of the core, preferably over the entire axial height H31 of the receiving face 31, a layer of uncured raw rubber. In order to do that, the first laying head 5 presses against the core a continuous strip of uncured raw rubber coming from the associated pump 6, and moves parallel to the central axis X4 of the core 4 while the core 4 is driven in rotation by the shaft 18 about its central axis X4.

The changeover device 17 then switches the core 4 over to the second tire-building substation 3_2, facing which there is the second laying head 7 which is moved in closer along the rail 15_R.

The second laying head 7 then applies to the core 4, in this instance to the layer of uncured raw rubber, the front of a Glass-Reinforced Plastic reinforcing strip, in this instance for example a glass-reinforced plastic reinforcing strip in skim-coated form, which is to say which has already been encased in rubber. The core 4 is rotated by the shaft 18, while the second laying head 7 is moved translationally parallel to the central axis X4 of the core, so as to continuously wrap the reinforcing strip onto the core, forming a succession of contiguous helical turns which, together, form a reinforcement of the hoop type. The operation may be repeated as required.

If the desire is rather to lay a glass-reinforced plastic reinforcing strip in its bare form, then after the reinforcing strip has been laid, the core 4 will need to be switched back over to the first tire-building substation 3_1 so as to cover the reinforcing strip with a layer of uncured raw rubber, and then the alternating operations of laying reinforcing strip then laying uncured raw rubber strip will need to be repeated, interspersed with changeover operations, as many times as required in order to obtain the desired layered reinforcement.

At the end of the laying of the reinforcing strip or strips, the core 4 remains in, or if appropriate returns to, the second tire-building substation 3_2.

The second laying head 7 is moved away along the rail 15_R, and the third laying head 12 takes its place, facing the core 4.

The third laying head 12 therefore successively wraps a first reinforcing ply and then a second reinforcing ply onto the core 4, on top of the hoop. The reinforcing plies advantageously have crossed reinforcements which, superposed with the substantially circumferential reinforcing threads contained in the hoop, form a reinforcement with triangular reinforcing structures which are advantageously non-deformable both axially and circumferentially.

The third laying head 12 then moves away back from the core 4, and the changeover device 17, by switching over the rotary head 19, returns the core 4 to the first tire-building substation 3_1.

Another first laying head 5 then covers the core 4, over the top of the reinforcing plies, with a layer of uncured raw rubber intended to form the tread of the tire 2, thus completing the building of the uncured annular tire 2A on the core 4.

The transfer device 100 then removes the core 4 bearing the uncured annular tire 2A from the first tire-building substation 3_1 and takes the core 4 either directly to the curing station 20 if the latter is ready, or to the buffer station 85 if it is necessary to wait for the curing station 20 to signal that it is ready via a demand signal.

The curing station 20 opens its first curing mold 50 so as to free access to the lower plate 52 and to the heating segments 40 that project axially with respect to the lower plate 52 and are in the retracted configuration.

The transfer device 100 then executes the axial introduction movement MX+ to slip the core 4 around the heating segments 40. Advantageously, the frustoconical portion 37 of the coupling portion 35 which is first to take up position around the heating segments 40 guides and centres the core relative to the lower plate 52. The introduction movement MX+ ceases when the shoulder 36 of the coupling portion 35 comes into abutment against the lower plate 52, in a position in which the exchange face 32 coincides axially with the heating segments 40.

The curing mold 50 is then closed again, so that the upper plate 54 and the ring 53 cover the lower plate 52, the heating segments 40 and the uncured annular tire 2A supported by the core 4.

The heating segments 40 are then deployed radially by the deployment mechanism 55 to come to press against the exchange face 32, as illustrated in FIGS. 11, 12 and 13. Thus, the first, heating, thermal source 23 is temporarily coupled to the exchange face 32, the majority or even the entirety of the surface area of which it occupies.

Thanks to the heating segments 40, the annular tire is raised to the appropriate curing temperature, and kept at this curing temperature for a predetermined appropriate duration until it becomes a cured annular tire 2B.

It will be noted that, as a preference, while the first core 4 and its annular tire 2 are being subjected to the curing operation in the first curing mold 50, or even beforehand, as soon as the first core 4 has entered the second tire-building substation 3_2 such that the changeover device 17 has a free shaft 18 in the first tire-building substation 3_1, the transfer device 100 will, as a parallel process, pick up the second core 4 from the heating station 91 and place the second core 4 in the tire-building station 3, where a second uncured annular tire 2A will be able to be built on the second core 4.

If the step of building the second uncured annular tire 2A is completed before the first mold of the curing station 20 has completed the operation of curing the first annular tire 2, the transfer device 100 may advantageously, still as a parallel process, retrieve the second core 4 and its second uncured annular tire 2A from the tire-building station 3 and place the second core 4 in the second curing mold 50 of the curing station 20, in order to begin the operation of curing the second annular tire 2.

In any event, as soon as the operation of curing the first annular tire 2 has finished, the heating segments 40 (of the first curing mold 50) are retracted by the deployment mechanism 55 so that they detach from the exchange face 32 and free the core 4, as visible in FIGS. 8, 9 and 10.

The (first) curing mold 50 is opened, in this instance by raising the upper plate 54 and the ring 53 to allow the transfer device 100 to access the (first) core 4 and extract the core 4 from the curing station 20. It will be noted that, as a preference, the opening of the curing mold 50 and the radial contraction of the heating segments 40 are performed simultaneously.

The transfer device 100 grasps hold of the core 4, in this instance via the second coupling portion 35', accessible from above, and then executes an axial removal movement MX− which frees the core from the heating segments 40, whereas the heating segments 40 remain in place in the curing station 20, in a position that is axially unchanged with respect to the lower plate 52, which position the heating segments 40 have advantageously maintained throughout the process of setting the core in place, curing, then extracting the core.

The first, heating, thermal source 23, thus detached from and moved clear of the core 4 to remain in the curing station 20 in fact completely frees up the exchange face 32, thus rendering the exchange face 32 available for the future cooling and extraction operation.

The transfer device 100 transfers the (first) core 4 from the curing station 20 to the extraction station 21 where the transfer device 100 places the core 4 on the receiving table 76, slipping the bore 33 of the core over the central barrel 71 thereby creating an annular flow path 72, and in such a way that the annular tire 2 rests against the retaining lip 77A of the opening 77, as visible in FIG. 14.

The suction device 73 is then activated to generate a forced air flow 70 which acts as second, refrigerating, thermal source 24 and which advantageously sweeps over the entire surface area of the exchange surface 32 so as to cool the core 4, as visible in FIGS. 14, 15 and 17. Advantageously, no forced air movement is created at the radially outer surface of the cured annular tire 2B, this being so that the core 4 is cooled more than the annular tire 2.

The hood 78 is lowered against the core 4 by the drive system 82 while the forced ventilation, and therefore the cooling of the core, continue, until the core 4 is brought down to a suitable temperature referred to as "extraction temperature" at which the radial thermal contraction of the core 4 with respect to the annular tire 2 is enough to allow forced separation of the core 4 and of the annular tire 2 by axial shearing. As a preference, the suction device 73 is switched off, and therefore the forced air flow 70 is halted, as soon the core 4 reaches the desired extraction temperature and/or, and which is equivalent, the desired degree of radial contraction.

By way of indication, the radial contraction of the receiving face 31 of the core that is obtained via the differential-cooling operation may be of the order of 0.2 mm to 1 mm.

The axial shearing is generated by the hood 78, which forms an ejector member 25, which pushes on the core 4 and thus forces the core 4 to move axially through the cured annular tire 2B which is itself restrained in abutment against the receiving table 76, as is illustrated in FIGS. 16 and 18.

The core 4 is thus dissociated, and progressively and completely extracted, from the cured annular tire 2B and collected on the lifting plate 75.

The transfer device 100 can then retrieve the cured annular tire 2B and store it in a tire storage space 97 of the buffer station 85, where the cured annular tire 2B passively completes its vulcanization as it gradually cools.

The transfer device 100 also retrieves, separately from the annular tire 2 but advantageously using the same multifunction gripper tool 108, the core 4 that has been relieved of its tire, and conveys the core 4 to another station.

If this is the end of a manufacturing run, such that the facility 1 needs to be shut down or, more commonly, the type of core 4 needs to be changed in order to produce a range of tires 2 of different dimensions, then the core 4 may be transferred from the extraction station 21 to a core storage space 87 of the buffer station 85.

If, more commonly, the current manufacturing run is to be continued, so that it will be beneficial to reuse the same (first) core 4 in a further tire-building and curing cycle for the same type of annular tire 2, then one and/or the other of the following two options may be envisioned.

According to a first option, the (first) core 4 may be transferred from the extraction station 21 to the heating station 91, a spare further core 4 present in the heating station 91 (here for example a third core 4) may be picked up and this other core, immediately available at the preheat temperature, may be conveyed to the tire-building station 3 to begin a new manufacturing cycle. Such a first option, which replaces the core 4 between two successive manufacturing cycles, will notably be called for if the first core 4 coming from the extraction station 21 is deemed to be too cold to be able to be reused directly as-is in the tire-building station 3. According to a possible sub-option, if the heating station 91 already contains a number of cores 4 corresponding to the maximum capacity it can accommodate, then the (first) core 4 coming from the extraction station 21 may first of all be directed to the buffer station 85 and then another core may be picked up from the heating station 91 and conveyed to the tire-building station 3 before finally transferring a core, namely the first core or else another core that is situated in the buffer station 85, from the buffer station 85 to the heating station 91.

According to a second option, if the core 4 coming from the extraction station 21 is still sufficiently hot, insofar as the core 4 is at a temperature comprised within the range of acceptable preheat temperatures such that the core is directly compatible with a new tire-building operation, the core 4 may be transferred directly from the extraction station 21 to the tire-building station 3 to begin a new cycle, without passing via a new preheating step. Substantial energy savings are thus realized.

The temperature of the core 4 as it leaves the extraction step may be evaluated by any suitable means, either by direct measurement for example using a pyrometer that measures the temperature of the receiving face 31 of the core, or for example by means of a chart that enables the temperature of the core to be estimated as a function of the curing temperature, the parameters (temperature, flow rate, etc.) of the forced air flow 70, and the duration of the residence time that the core has spent at the extraction station 21.

The above operations are advantageously repeated automatically for the entire manufacturing run, the core or cores 4 advantageously being recirculated, directly or pairwise with an intermediate passage via the heating station 91, as the annular tires 2 are progressively manufactured.

The various components and the various stations of the facility 1, notably the thermal sources 23, 24, the transfer device 100, and the various motorized components of the stations, such as the deployment mechanism 55 that deploys the heating segments, the system that closes the curing molds 50, the drive system 82 that drives the hood 78, or the rotary support branches 98 will advantageously be controlled and coordinated by a suitable control unit of the programmable controller or computer type.

Of course, the disclosure is in no way limited only to the embodiment variants described in the foregoing, a person skilled in the art being notably capable of isolating or freely combining one or another of the above-mentioned features with one another, or of substituting equivalents therefor.

What is claimed is:

1. A facility for manufacturing tires, said facility comprising;
   an assembly station configured to place one or more tire components onto a core so as to form an uncured annular tire,
   a curing station configured to receive the assembly formed by said core and the uncured annular tire and to heat said assembly during a curing operation so as to obtain a cured annular tire, and
   an extraction station configured so as to separate, after the curing operation, the cured annular tire from the core,
   wherein the core has a tubular wall extending along and around a central axis and which extends in thickness radially with respect to said central axis from a radially outer first annular face, referred to as "receiving face", which is intended to receive the tire component or components, as far as a radially inner second annular face, referred to as "exchange face", which surrounds the central axis and which is intended to allow exchanges of heat between the tubular wall of the core and thermal sources external to said core,
   the curing station comprises a first, heating, thermal source which is designed to press against the exchange face of the core when said core is in said curing station so as to heat said core and the annular tire during the curing operation, and then dissociate from the core so as to leave the exchange face free again when the core and the cured annular tire leave said curing station and are transferred to the extraction station after the curing operation, and
   said extraction station comprises a second, refrigerating, thermal source which is designed so that when the core and the cured annular tire are in the extraction station, it takes the place of the first thermal source in contact with said exchange face of the core so as to cool said core in such a way as to create a radial clearance between the receiving face of the core and the cured annular tire through differential radial contraction of the tubular wall of the core relative to the cured annular tire thus allowing an ejector member with which the extraction station is equipped to remove the cured annular tire axially from the core.

2. The facility according to claim 1, wherein the radial distance from the receiving face to the central axis is equal to or greater than 175 mm and wherein the thickness of the tubular wall of the core, which radially separates the exchange face from the receiving face, is less than or equal to 40 mm.

3. The facility according to claim 1, wherein the first thermal source, used by the curing station, comprises a plurality of heating segments, said heating segments being designed in such a way as to be pressed against the exchange face from the inside of the core so as to occupy, during the curing operation, and then free up after the curing operation, a contact area on the exchange face, referred to as "useful heating area", which represents axially at least 80% of the axial height of the receiving face that is covered by the annular tire and angularly, in terms of azimuthal coverage about the central axis, at least 270 degrees.

4. The facility according to claim 1, wherein the curing station comprises a curing mold designed to delimit a curing chamber intended to receive and contain the assembly formed by the core and the uncured annular tire in order to perform the curing operation, said curing mold to this end comprising a lower plate, on which the core is rested, an outer ring designed to surround the radially outer face of the tire that is to be cured, and an upper plate which collaborates with the outer ring at the axially opposite end from the lower plate so as to close the curing chamber, and wherein the first thermal source comprises a plurality of heating segments that are arranged at the center of the curing chamber and are placed under the dependency of a deployment mechanism which is designed to place said heating segments alternately in a deployed configuration in which said heating segments are compressed in a centrifugal radial direction firmly against the exchange face of the core, and a retracted configuration in which said heating segments are positioned radially set back from the exchange face so that, after the curing operation, the core can be removed from said curing chamber by causing said core to move axially relative to said heating segments and said heating segments can be left behind in the curing station waiting inside the curing chamber while the core bearing the cured annular tire coming from the curing chamber is conveyed to the extraction station.

5. The facility according to claim 4, wherein the deployment mechanism comprises a first pusher mounted with the ability to move axially and having a plurality of first ramps which are inclined in a first direction of inclination with respect to the main axis and which each collaborate with a heating segment, and a second pusher mounted with the ability to move axially and having a plurality of second ramps which are inclined with respect to the main axis in a second direction of inclination opposite to the first direction of inclination and which each collaborate with one of said heating segments so that the radial movement of the heating segments, enabling transition from the retracted configuration to the deployed configuration and vice versa, is brought about by axially moving the first pusher and the second pusher apart and respectively by axially moving the first pusher and the second pusher closer together.

6. The facility according to claim 1, wherein the second, refrigerating, thermal source, used by the extraction station, is formed by a forced air flow which flows in contact with the exchange face, and in that the extraction station comprises a central barrel over which the core bearing the cured annular tire is slipped so as to delimit, between the radially outer face of said central barrel and the radially inner exchange face of the tubular wall of the core, an annular flow path of which the radial width is between 5 mm and 20 mm, which flow path is connected to a suction device by means of a manifold so that when the suction device is activated, a forced air flow is created and enters the flow path via an intake zone situated at a first axial end of the annular flow path, which travels along said flow path along the exchange face and is then discharged via the manifold at a second axial end of said flow path, which end is axially the opposite end to the first axial end.

7. The facility according to claim 6, wherein the extraction station comprises a lifting plate which supports the central barrel and which is intended to receive the core when said core is separated from the cured annular tire, said lifting plate being mounted with the ability to move axially in a vertical direction, said extraction station further comprising a horizontal receiving table which is pierced with an opening arranged in such a way as to, on the one hand, allow the central barrel and the core to pass freely through said receiving table and, on the other hand, exhibit an annular retaining lip which forms an axial end stop against the cured annular tire, said extraction station also comprising a hood which is designed to come to bear axially against the core (4), said hood being provided with vents allowing the air to pass through said hood to enter the flow path delimited between the central barrel and the tubular wall of the core, and said hood forming the ejector member that allows the core, accompanied in its movement by the lifting plate that receives and supports said core to be pushed back axially through the opening in the receiving table while the cured annular tire is held back bearing against the retaining lip of said opening in the receiving table so that the core is extracted from the cured annular tire.

8. The facility according to claim 1, wherein the receiving face is formed in a single piece so as to exhibit continuity of material all around the central axis.

9. The facility according to claim 1, wherein the core is made up, for more than 90% of its mass, of a single one-piece shell ring of circular base centred on the central axis and which comprises at least the tubular wall.

10. The facility according to claim 1, wherein the core has, in the axial continuation of the receiving face, projecting axially from said receiving face, an annular coupling portion which exhibits at least one of the following two arrangements: (i) a first arrangement whereby the coupling portion exhibits, on its radially outer face, on the one hand, a shoulder which is radially re-entrant with respect to the receiving face, which shoulder thus forms an axial limit of the receiving face and an axial end stop able to halt a movement of axial introduction of the core into at least one of the stations and, on the other hand, a frustoconical portion that axially precedes the shoulder on the opposite side to the receiving face, so as to center the core with respect to the station during said introduction movement, and (ii) a second arrangement whereby the coupling portion exhibits, on its radially inner face which axially prolongs the exchange face, away from said exchange face, one or more gripping depressions provided so as to allow said core to be grasped by a gripping tool carried on board a transfer device allowing the core to be transported from one station to the other.

11. The facility according to claim 1, further comprising a buffer station allowing temporary storage of cores, notably at least one of spare cores which have no annular tire on them and of cores bearing an uncured annular tire, and temporary storage of cured annular tires their core extracted, said buffer station for this purpose comprising at least one tower which is provided with a plurality of storage locations including, on the one hand, a first type of storage location referred to as "core spaces" which are each configured to receive at least one empty core or core supporting an uncured annular tire and which for that purpose each comprise at least one suspension branch arranged in such a way that the core that is to be stored can be suspended by engaging the central opening of said core over said at least one suspension branch and, on the other hand, a second type of storage location referred to as "tire spaces" which are each configured to accept at least one cured annular tire and to be able to rotate the cured annular tire so as to prevent said cured annular tire from becoming ovalized under the effect of gravity, said tire spaces being provided for that purpose with rotary support branches designed to support the cured annular tire by supporting the radially outer face of said cured annular tire and to rotate said cured annular tire on itself about its central axis, as well as at least one guide branch configured to be engaged in the central recess of said annular tire and collaborate with the radially inner face of the cured annular tire in order to hold said cured annular tire in place in the tire space and guide said cured annular tire while it is being rotated by the rotary support branches.

12. The facility according to claim 1, wherein it comprises a transfer device provided with a robot arm allowing the core to be transported successively from one station to the other, and wherein said robot arm bears a gripping tool provided with a gripper which comprises a plurality of jaws which are mounted with the ability to move radially in radial directions which differ from one jaw to another, and which are arranged in such a way as to be able alternately either to grasp of the core from the inside, by performing centrifugal clamping against a radially inner face of said core, or grasp the cured annular tire, separated from its core, from the outside by performing centripetal clamping against a radially outer face of said cured annular tire.

13. A method for manufacturing a tire comprising a tire-building step, during which a core is set down in a tire-building station and one or more tire components are placed onto said core in order to form an uncured annular tire during which the core bearing its uncured annular tire is transported from the tire-building station as far as a curing station distant from the tire-building station, a curing step during which the assembly formed by said core and the uncured annular tire placed in the curing station is cured to obtain a cured annular tire, a second transfer step during which the core bearing the cured annular tire is transported from the curing station to an extraction station distant from the curing station, and then an extraction step during which, in the extraction station, the cured annular tire is separated from the core, wherein the core has a tubular wall which extends along and around a central axis and which extends in thickness radially with respect to said central axis from a radially outer first annular face, referred to as "receiving face", which is intended to receive the tire component or components, as far as a radially inner second annular face referred to as "exchange face" which surrounds the central axis and which is intended to allow exchanges of heat between the tubular wall of the core and thermal sources external to said core, wherein during the curing step a first, heating, thermal source is pressed against the exchange face of the core so as to perform the curing operation, and then said first thermal source is dissociated from the core so as to leave the exchange face free again when the second transfer step of transferring to the extraction station is performed, and wherein, during the extraction step, a second, refrigerating, thermal source is brought into contact with the exchange face thus freed, so as to cool said core in such a way as to create a radial clearance between the receiving face of the core and the cured annular tire through differential radial contraction of the tubular wall of the core relative to the cured annular tire, and the cured annular tire is removed axially from the core.

14. The method according to claim 13, wherein the tire-building step is preceded by a preheating step during which the core intended for tire-building, empty of any annular tire, is raised to a temperature known as the "preheat temperature" which is comprised between 50° C. and 100° C., then said core thus raised to the preheat temperature is transferred into the tire-building station for the tire-building step, and wherein said preheating step is performed either by recirculating a core which is transferred directly from the extraction station if the residual temperature of the core after the end of the extraction step, at the end of the preceding manufacturing cycle, corresponds to a preheat temperature deemed to be acceptable, or by picking up another core, empty of any annular tire, placed on standby beforehand and raised to a suitable preheat temperature in a heating station, and thus immediately available at the desired preheat temperature.

15. The method according to claim 13, wherein at least two cores are used in the one same manufacturing cycle, applying the curing step to a first core bearing an annular tire and placed in the curing station while, in concurrent time, at least one of the extraction step and the tire-building step is applied to a second core.

* * * * *